United States Patent
Kim et al.

(10) Patent No.: US 11,407,106 B2
(45) Date of Patent: Aug. 9, 2022

(54) ELECTRONIC DEVICE CAPABLE OF MOVING AND OPERATING METHOD THEREOF

(71) Applicant: Samsung Electronics Co., Ltd., Gyeonggi-do (KR)

(72) Inventors: Jin-Won Kim, Gyeonggi-do (KR); Jung-Gap Kuk, Seoul (KR); Seung-Beom Han, Gyeonggi-do (KR); Dong-Sik Chang, Seoul (KR)

(73) Assignee: Samsung Electronics Co., Ltd

( * ) Notice: Subject to any disclaimer, the term of this patent is extended or adjusted under 35 U.S.C. 154(b) by 578 days.

(21) Appl. No.: 16/160,193

(22) Filed: Oct. 15, 2018

(65) Prior Publication Data

US 2019/0134812 A1 May 9, 2019

(30) Foreign Application Priority Data

Nov. 9, 2017 (KR) .................. 10-2017-0148932

(51) Int. Cl.
*G05B 19/04* (2006.01)
*B25J 9/16* (2006.01)
(Continued)

(52) U.S. Cl.
CPC .......... *B25J 9/1661* (2013.01); *G05B 19/042* (2013.01); *G06Q 10/0631* (2013.01); *G05B 2219/40233* (2013.01); *G06Q 50/01* (2013.01)

(58) Field of Classification Search
CPC . B25J 19/02; B25J 9/1661; B25J 13/08; B25J 5/00; B25J 11/0005; B25J 9/1679;
(Continued)

(56) References Cited

U.S. PATENT DOCUMENTS 9,603,499 B2 3/2017 Friedman et al.
2002/0024312 A1 2/2002 Takagi
(Continued)

FOREIGN PATENT DOCUMENTS

EP 2 281 667 2/2011
JP 2005-065021 3/2005
(Continued)

OTHER PUBLICATIONS

International Search Report dated Nov. 22, 2018 issued in counterpart application No. PCT/KR2018/010613, 11 pages.
(Continued)

*Primary Examiner* — Stephen Holwerda
(74) *Attorney, Agent, or Firm* — The Farrell Law Firm, P.C.

(57) ABSTRACT

An electronic device is provided. The electronic device includes at least one processor and a memory. The memory stores instructions that, when executed, cause the at least one processor to identify a task corresponding to a task execution instruction acquired by an input device of the electronic device, identify user information corresponding to the task, identify a target spot of the electronic device for executing the task, based on the task and the user information, with respect to a position of a user corresponding to the identified user information, and control a driving circuit of the electronic device to move the electronic device to the identified target spot.

20 Claims, 34 Drawing Sheets

(51) Int. Cl.
*G05B 19/042* (2006.01)
*G06Q 10/06* (2012.01)
*G06Q 50/00* (2012.01)

(58) Field of Classification Search
CPC .. G06Q 10/0631; G06Q 50/01; G05B 19/042; G05B 2219/40411; G05B 2219/40298; G05B 2219/40414; G05B 2219/40233
See application file for complete search history.

(56) References Cited

U.S. PATENT DOCUMENTS

| | | |
|---|---|---|
| 2005/0041839 A1 | 2/2005 | Saitou et al. |
| 2005/0071047 A1 | 3/2005 | Okabayashi et al. |
| 2006/0106496 A1* | 5/2006 | Okamoto .............. G05D 1/0278 700/255 |
| 2007/0027579 A1* | 2/2007 | Suzuki .................... G05D 1/12 700/245 |
| 2007/0152619 A1 | 7/2007 | Sugiyama et al. |
| 2008/0221730 A1* | 9/2008 | Sakata ................... G06N 3/004 700/245 |
| 2010/0049368 A1 | 2/2010 | Chen |
| 2013/0066467 A1 | 3/2013 | Song et al. |
| 2014/0172909 A1 | 6/2014 | Park et al. |
| 2014/0249676 A1* | 9/2014 | Florencio ............... B25J 9/1694 700/258 |
| 2016/0136817 A1 | 5/2016 | Fouillade et al. |
| 2017/0160703 A1 | 6/2017 | Heo et al. |
| 2017/0225321 A1* | 8/2017 | Deyle .................... B25J 9/1679 |
| 2018/0081365 A1* | 3/2018 | Asukai ...................... B25J 5/00 |

FOREIGN PATENT DOCUMENTS

| | | |
|---|---|---|
| JP | 2017-177228 | 10/2017 |
| KR | 1020110015731 | 2/2011 |
| KR | 1020110124837 | 11/2011 |
| KR | 1020130010553 | 1/2013 |
| WO | WO-2016170808 A1 * | 10/2016 ........... G05D 1/0246 |

OTHER PUBLICATIONS

European Search Report dated Jul. 13, 2020 issued in counterpart application No. 18876627.3-1205, 14 pages.
Korean Office Action dated Feb. 18, 2022 issued in counterpart application No. 10-2017-0148932, 15 pages.

* cited by examiner

|  | | 530 | | | 540 | |
|---|---|---|---|---|---|---|
|  |  | DIRECTION | DISTANCE | PHOTOGRAPHING DIRECTION | FEEDBACK INFORMATION |  |
| 531 | 1ST IMAGE | (θ1, Φ1) | X1 | (θ5, Φ5) | ELIMINATION | 541 |
| 532 | 2ND IMAGE | (θ1, Φ1) | X1 | (θ6, Φ6) | SNS UPLOADING | 542 |
| 533 | 3RD IMAGE | (θ3, Φ3) | X3 | (θ7, Φ7) | POSITIVE FEEDBACK RECEIVED | 543 |
| 534 | 4TH IMAGE | (θ4, Φ4) | X4 | (θ8, Φ8) | NEGATIVE FEEDBACK RECEIVED | 544 |

FIG.5B

ELECTRONIC DEVICE CAPABLE OF MOVING AND OPERATING METHOD THEREOF

CROSS-REFERENCE TO RELATED APPLICATION

This application claims the priority under 35 U.S.C. § 119(a) to Korean Patent Application Serial No. 10-2017-0148932, filed on Nov. 9, 2017, in the Korean Intellectual Property Office, the entire disclosure of which is incorporated herein by reference.

BACKGROUND

1. Field

The present disclosure relates generally to an electronic device, and more particularly to an electronic device capable of moving and an operating method thereof.

2. Description of the Related Art

Various electronic devices capable of moving (e.g., robots) have actively been introduced. The electronic devices include various moving components (e.g., wheels, two legs, propellers for flying, etc.) such that the electronic devices can move from one spot to another. When detecting the occurrence of a particular event, the electronic device can move to a spot corresponding to the detected event. For example, when receiving a message to be delivered to a specific user, the electronic device may move near the specific user and visually or aurally provide the content of the message to the specific user.

When users are provided with a particular service, they may differ from each other in preference for a position where the electronic device provides the particular service. For example, when the electronic device provides a photographing service, a first user may prefer to take a picture from the left side while a second user may prefer to take a picture from the right side. When performing a task, existing electronic devices do not consider preference positions by users. Thus, user satisfaction for task execution results is low. In addition, an electronic device which determines a task execution position or a movement route based on a state of a user, such as whether a user is watching a specific spot, may be desired.

SUMMARY

The present disclosure has been made to address at least the disadvantages described above and to provide at least the advantages described below.

Aspects of the present disclosure provide an electronic device which determines at least one of a position and movement route for executing a task, based on at least one of a user identification result and a state of the user, and an operation method thereof.

In accordance with an aspect of the present disclosure, an electronic device is provided. The electronic device includes at least one processor and a memory. The memory stores instructions that, when executed, cause the at least one processor to identify a task corresponding to a task execution instruction acquired by an input device of the electronic device, identify user information corresponding to the task, identify a target spot of the electronic device for executing the task, based on the task and the user information, with respect to a position of a user corresponding to the identified user information, and control a driving circuit of the electronic device to move the electronic device to the identified target spot.

In accordance with an aspect of the present disclosure, an electronic device is provided. The electronic device includes at least one processor and a memory. The memory stores instructions that, when executed, cause the at least one processor to identify a task corresponding to a task execution instruction acquired by an input device of the electronic device, identify a state of a user corresponding to the task, identify a target spot of the electronic device for executing the task, based on the task and the state of the user, with respect to a position of the user, and move the electronic device to the identified target spot.

In accordance with an aspect of the present disclosure, an electronic device is provided. The electronic device includes at least one processor and a memory. The memory stores instructions that, when executed, cause the at least one processor to identify a task corresponding to a task execution instruction acquired by an input device of the electronic device, identify user information corresponding to the task, identify a target spot of the electronic device as a first position when the user information is identified to a first user or as a second position different from the first position when the user information is identified to a second user different from the first user, control a driving circuit of the electronic device to move the electronic device to the identified target spot, and execute the task at the target spot.

In accordance with an aspect of the present disclosure, an electronic device is provided. The electronic device includes at least one processor and a memory. The memory stores instructions that, when executed, cause the at least one processor to identify a task corresponding to a task execution instruction acquired by an input device of the electronic device, identify user information corresponding to the task, identify a target spot of the electronic device as a second position when the user is identified to be in a first state at a first position or as a third position different from the second position when the user is identified to be in a second state at the first state, control a driving circuit of the electronic device to move the electronic device to the identified target spot, and execute the task at the target spot.

In accordance with an aspect of the present disclosure, a method for operating an electronic device is provided. The method includes identifying a task corresponding to an acquired task execution instruction, identifying user information corresponding to the task, identifying a target spot of the electronic device for executing the task, based on at least the task and the identified user information, with respect to a position of a user corresponding the identified user information, and moving to the identified target spot.

In accordance with an aspect of the present disclosure, a method for operating an electronic device is provided. The method includes identifying a task corresponding to an acquired task execution instruction, identifying a state of a user corresponding to the task, and identifying a target spot of the electronic device for executing the task, based on at least the task and the state of the user, with respect to a position of the user.

In accordance with an aspect of the present disclosure, a method for operating an electronic device is provided. The method includes identifying a task corresponding to an acquired task execution instruction, identifying user information corresponding to the task, identifying a target spot of the electronic device as a first position when the user information is identified to a first user or as a second position different from the first position in response to the user information being identified to cover a second user different from the first user, moving to the identified target spot, and executing the task at the target spot.

In accordance with an aspect of the present disclosure, a method for operating an electronic device is provided. The method includes identifying a task corresponding to an acquired task execution instruction, identifying a state of a user corresponding to the task, identifying a target spot of the electronic device as a second position in response to the user being identified to be in a first sate at a first position or as a third position different from the second position in response to the user being identified to be in a second state at the first position, moving to the identified target spot, and operating the task.

BRIEF DESCRIPTION OF THE DRAWINGS

The above and other aspects, features and advantages of certain embodiments of the disclosure will be more apparent from the following detailed description taken in conjunction with the accompanying drawings, in which:

FIG. 5B is a diagram of a database of task execution results, according to an embodiment;

DETAILED DESCRIPTION

Figure 1A:
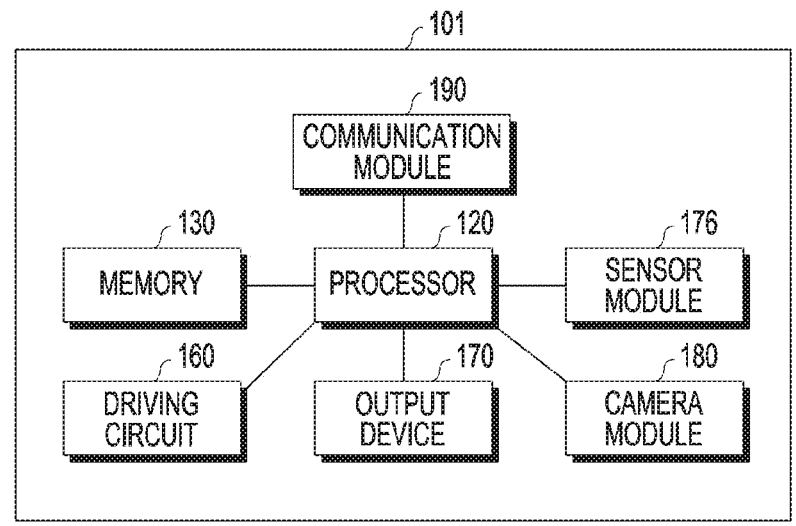
FIG. 1A is a block diagram of an electronic device, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device indicates different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. Terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" indicates a person using an electronic device or a device (e.g., an artificial intelligence electronic device) using an electronic device.

FIG. 1A is a diagram of an electronic device, according to an embodiment.

Referring to FIG. 1A, an electronic device 101 may include a processor 120, a memory 130, a driving circuit 160, an output device 170, a sensor module 176, a camera module 180, and a communication module 190.

The processor 120 may drive software to control at least one different element (e.g., hardware or software element), connected to the processor 120, of the electronic device 101 and to conduct various data processing and calculations. The processor 120 may load instructions or data received from a different element (e.g., a sensor module 176 or a communication module 190) to a volatile memory (e.g., RAM), process the instructions or data, and store the resulting data in a non-volatile memory (e.g., NAND). The processor 120 may include a main processor (e.g., a CPU or an AP) and additionally or generally an auxiliary processor that operates independently of the main processor and consumes lower power than the main processor or which is specialized for a designated function (e.g., graphic processing unit, image signal processor, sensor hub processor, or communication processor (CP)). The auxiliary processor may operate separately from the main processor or while being embedded in the main processor. A plurality of chips or circuits that are capable of calculation may be contained in the electronic device 101.

The auxiliary processor may control at least a part of the function or state relevant to at least one of the elements of the electronic device 101, in substitution for the main processor during an inactive state of the main process (e.g., sleep state) or together with the main processor during the active state of the main process (e.g., state for performing an application). The auxiliary processor (e.g., image signal processor or communication processor) may be realized as a part of functionally related different elements. The memory 130 may store various data that is used by at least one element of the electronic device 101, such as input or output data for software or instructions relevant thereto. The memory 130 may include a volatile memory or a non-volatile memory. The memory 130 may store information about task execution conditions corresponding to various tasks. The electronic device 101 may store the information with the task execution conditions corresponding to user identification information. The memory 130 may store an algorithm or program capable of identifying users and at least one piece of user identification information already acquired. The processor 120 may identify a user by applying algorithm or program for identification to the data from at least one of the sensor module 176 or the camera 180. The processor 120 may operate depending on task execution conditions corresponding to the user identification information. The electronic device 101 may store the information with the task execution conditions corresponding to user states. The memory 130 may store an algorithm or program capable of identifying user states and at least one user state already acquired. The processor 120 may identify a user state by applying algorithm or program for identification to the data from at least one of the sensor module 176 or the camera 180. The processor 120 may operate depending on task execution conditions corresponding to the user states. Correlation information between user identification information and a task execution condition may be generated based on task execution results according to various task execution conditions with respect to at least corresponding user identification information and based on the feedback information corresponding to the results. The correlation information between user identification information and a task execution condition may be generated by processing, such as database clustering and may be produced or updated according to various learning algorithm application results. Correlation information between a user state and a task execution condition may also be generated through processing a database of existing execution results and feedback information. Below, a detailed description will be given of a generation procedure of correlation information. The memory 130 may store therein programs for various motions including a program for movement or rotation, a program for image analysis, a program for recognizing a user pose, and the like, which will be described below. At least a part of a program for operating the electronic device 101 may be stored in an external device (e.g., server). The electronic device 101 may send a query to the external device, and then the external device may use the data contained in the query to generate a response and may transmit the response to the electronic device 101.

The driving circuit 160 may allow at least a part of the electronic device 101 to move. The driving circuit 160 may allow the electronic device 101 to move from a first position to a second position. The electronic device 101 may further include a wheel and the driving circuit 160 may include a motor or actuator connected to the wheel. The processor 120 may control the driving control circuit 160 to rotate or brake the wheel in order for the electronic device 101 to move from a first position to a second position. The driving circuit 160 may be controlled to rotate the wheel at a first angular velocity at the time of starting from the first position and to reduce the angular velocity of the wheel as the electronic device approaches the second position. When the electronic device 101 is detected to arrive at the second position, the driving circuit 160 may be controlled to stop the wheel. The electronic device 101 may include a plurality of legs and the driving circuit 160 may be connected to each of the plurality of legs and may include a motor or actuator capable of controlling the motion of the plurality of legs. The electronic device 101 may include at least one propeller for flying and the driving circuit 160 may include a motor or actuator for rotating at least one propeller.

The output unit 170 may include various kinds of devices such as a display device, a sound output device, a vibration output device, etc. The display device is a device for visually providing information for a user of the electronic device 101 and may include a display, a hologram device, or a projector, and a control circuit for controlling a corresponding device. The display device may include a touch circuitry capable of sensing a touch input of the user or a pressure sensor capable of measuring the intensity of the pressure imposed by the user's touch. The electronic device 101 may present an application execution screen, a popup window, an indicator, and various user interfaces (UI) for user interaction on a display device, or may adjust the brightness of the display, with no limitations to graphic objects presented on the display device. The sound output device is a device for outputting a sound signal to the outside the electronic device 101 and may include a speaker for general use, such as multimedia player or record player, and a receiver for exclusive use in telephone reception. A receiver may be formed integrally with or separately from a speaker. The electronic device 101 may output voice for interaction with a user, using various text-to-speech (TTS) programs. The electronic device 101 may output a beep for indication in response to task execution instructions from a user. The electronic device 101 may adjust the volume or tempo of speech output in response to task execution instructions. The vibration output device may convert an electric signal to a mechanical stimulus (e.g., vibration or movement) or electric stimulus that the user can recognize via the sensation of touch or movement thereof. The vibration output device may include a motor, a piezoelectric element, or an electric stimulator.

The sensor module 176 may generate an electric signal or data value corresponding to an internal operation state (e.g., power or temperature) or an external environment state. The sensor module 176 may include a gesture sensor, a gyro sensor, a barometric pressure sensor, a magnetic sensor, an acceleration sensor, a grip sensor, a proximity sensor, a color sensor, an infrared (IR) sensor, a biosensor, a temperature sensor, a humidity sensor, an ultrasonic sensor, or an illumination sensor. The processor 120 may perform user identification, user posture recognition, barrier detection, etc., according to various information received through the sensor module 176.

The camera module 180 may take still picture or moving pictures. The camera module 180 may include at least one lens, an image sensor, an image signal processor, or a flash. The camera module 180 may include a three-dimensional camera, which may be implemented as a stereoscopic camera. The processor 120 may analyze images acquired through the camera to identify various information including user position information, relative positions between multiple users, positions of substances situated in an external environment, user identification information, user states, information relevant to user feedback, etc.

The communication module 190 may support establishment of a wired or wireless communication channel between the electronic device 101 and an external electronic device (e.g., a different electronic device, or a server) and communication through established communication channel. The communication module 190 may include at least one communication processor that operates independently of the processor 120 (e.g., AP) and supports wired or wireless communication.

The communication module 190 may include a wireless communication module (e.g., cellular communication module, a near-field communication module, or a wired communication module (e.g., local area network (LAN) communication module, or power line communication module) and use a corresponding communication module to communicate with an external electronic device via a first network (e.g., a near-field communication network such as Bluetooth™, WiFi direct, or Infrared Data Association (IrDA)) or a second network (e.g., a telecommunications network, such as a cellular networks, the Internet, or a computer network (e.g., LAN or wide area network (WAN)).The above-mentioned, various kinds of communication module 190 may be implemented in a single chip or in respective chip. The wireless communication module may utilize user information stored in a transcriber identification module to identify and certify the electronic device within a communication network.

Some of the elements may be connected to each other through a communications mode between peripheral devices (e. g., bus, general purpose input/output (GPIO), serial peripheral interface (SPI), or mobile industry processor interface (MIPI)) to reciprocally exchange signals (e.g., instructions or data).

Instructions or data may be transferred between the electronic device 101 and an external electronic device via a server connected to the second network. Part or all of the operations executed in the electronic device 101 may be executed in a different one or plural external electronic devices. When needing to execute a function or service automatically or in response to a request, the electronic device 101 may execute the function or service by itself or may optionally ask an external electronic device to execute at least part of a function associated therewith. The external electronic device that receives the request may execute the requested function or an additional function and may inform the electronic device 101 of the result. The electronic device 101 may process the received result as it is, or additionally to provide the requested functions or services. Cloud computing, distributed computing, or client-server computing technology may be used.

Figure 1B:
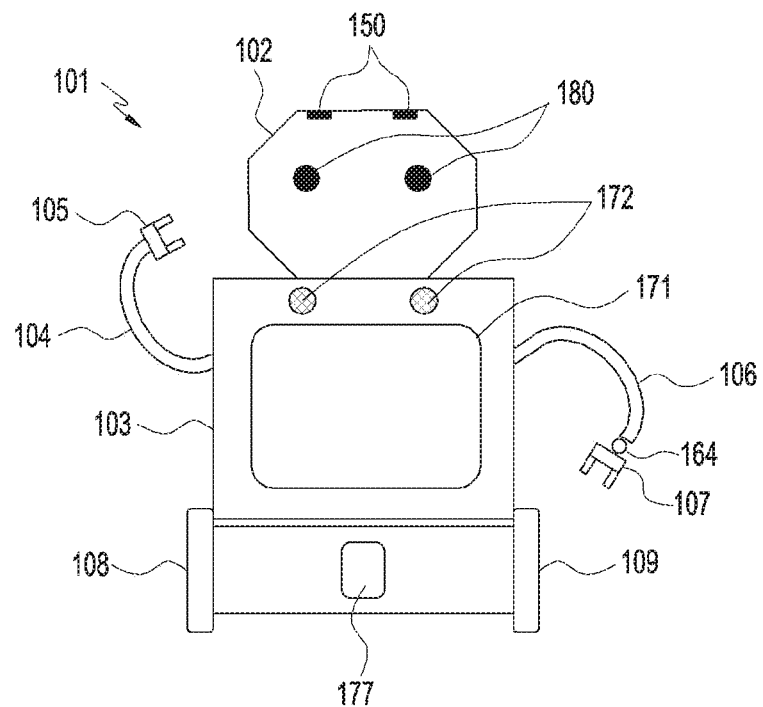
FIG. 1B is a diagram of an electronic device, according to an embodiment.

FIG. 1B is a diagram of an electronic device, according to an embodiment.

Referring to FIG. 1B, the electronic device 101 may be in the form of a robot that can move with the rotation of the wheels. The electronic device 101 may include a first housing 102 and a second housing 103. The first housing 102 may have a shape corresponding to a robot head and the second housing 103 may have a shape corresponding to a robot body, but no limitations are imposed on the shapes of the housings 102 and 103. A camera module 180 may be positioned in the first housing 102 and may be exposed through at least a part of the first housing 102 in order to receive light for generating an image. The electronic device 101 may include a plurality of cameras 180 which may constitute a stereoscopic camera. The electronic device 101 may identify the depth information of objects on the taken images and the 3D position information of objects. A microphone 150 may be positioned in the first housing 102 and may be exposed through at least a part of the first housing 102. The electronic device 101 may include a plurality of microphones 150 and may detect a difference in time point when the plurality of microphones 150 each receive speech. Based on the detected temporal difference, the electronic device 101 may identify information about a spot where a voice is generated. A speaker 172 may be positioned in the second housing 103 and may be exposed through at least a part of the second housing 103. The electronic device 101 may include a plurality of speakers 172. A display 171 may be positioned in the second housing 103 and may be exposed through at least a different part of the second housing 103. The electronic device 101 may present various visual items to a user through a display 171. A distance sensor 177 may be positioned inside or on the second housing 103. The distance sensor 177 may include a proximity sensor capable of identifying whether a barrier is located in a particular direction with respect to the electronic device 101. The proximity sensor may be implemented as a light sensor and the electronic device 101 can identify whether a barrier exists or not, depending on the intensity of light incident on the light sensor. The distance sensor 177 may include a sensor inclusive of an ultrasonic generation circuit and an ultrasonic receiving circuit. The distance sensor 177 may generate ultrasounds and receive reflective waves reflected from a barrier. The electronic device 101 may analyze properties of the reflective waves and identify the position of the barrier, based on analysis results. The distance sensor 177 may include a light source, such as laser or ultraviolet radiation, and a light sensor. The distance sensor 177 may generate laser or ultraviolet radiation and receive the light reflected by a barrier by using a light sensor. The electronic device 101 may identify a distance to a barrier by using the time of flight (TOF) of light. In addition to the foregoing, the electronic device 101 may include various distance sensors and it should be easily understood to those skilled in the art that there are no limitations to kinds of the distance sensor. The electronic device 101 may detect a barrier in front thereof through the distance sensor 177 and may move along a detour around the barrier other than a predetermined path in order to avoid collision with the barrier during movement. The second housing 103 may be connected to an end of a first arm 104 and to an end of a second arm 106. The first arm 104 may be connected at the other end thereof to a first hand 105 and the second arm 106 may be connected at the other end thereof to a second hand 107. A rotation means 164 (e.g., motor or actuator) may be located between the second arm 106 and the second hand 107 and the second hand 107 may rotate with the rotation of the rotation means 164. Between the first arm 104 and the first hand 105 may be included a rotation means. The first hand 105 or the second hand 107 may include at least one finger. The electronic device 101 may include a rotation means to fold or unfold each finger. The electronic device 101 may include at least one rotation means to allow the first housing 102 to rotate with respect to the second housing 103 of the electronic device 101, and it should be understood to those skilled in the art that there are no limitations to the motion of the electronic device 101 and kinds and locations of the rotation means corresponding to the motion.

Figure 1C:
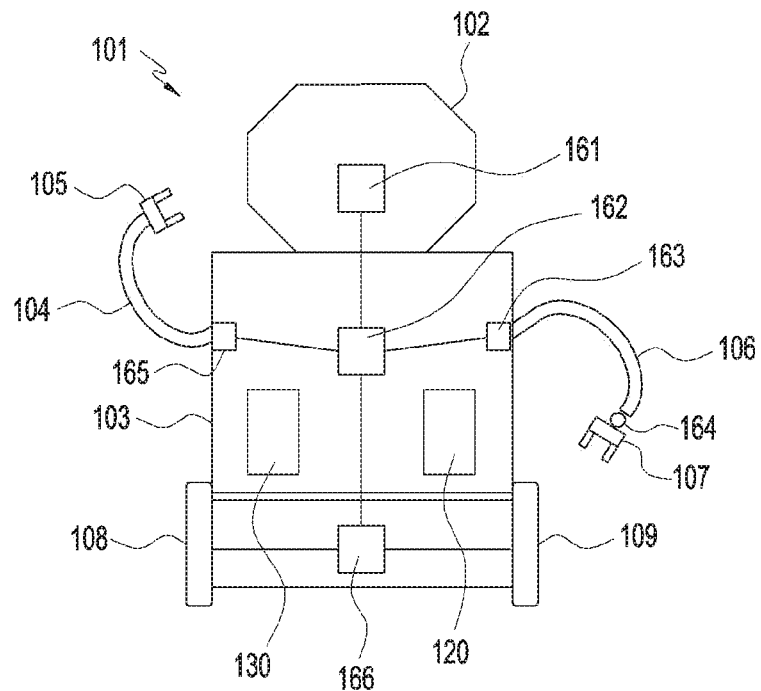
FIG. 1C is a diagram of a rotation means of an electronic device, according to an embodiment.

FIG. 1C is a diagram of a rotation means of an electronic device, according to an embodiment.

Referring to FIG. 1C, a motor 161 may be positioned within the first housing 102, and the first housing 102 may rotate with the rotation of the motor 161. As described in FIG. 1C, the first housing 102 may include at least one camera module 180 mentioned in FIG. 1B, and the electronic device 101 may change direction for photographing, depending on the rotation of the motor 161. In order to change a direction for photographing, the electronic device 101 may control the rotation angle or amount of the motor 161 in response to the extent of change of photographing direction and as a result, the camera module 180 may face in a desired photographing direction. The number of motor 161 may be plural. The first housing 102 may rotate in left and right directions or up and down directions depending on the rotation of a plurality of motors. When three motors are included in the first housing 102, the electronic device 101 may rotate the first housing 102 in the three directions of roll, pitch, and yaw. No limitations are imparted to the number of motors. In the second housing 103, a plurality of motors 162, 163, and 165 may be included. The electronic device 101 may rotate the motor 162 to conduct the motion of the second housing 103. The electronic device 101 may rotate the motors 163 and 165 to conduct the motions of the first arm 104 and the second arm 106, respectively. The electronic device 101 may rotate the motor 164 to conduct the motion of the hand. The electronic device 101 may rotate the motor 166 to conduct the rotation of wheels 108 and 109. Meanwhile, the second housing 103 may include a processor 120 and a memory 130 therein. Although illustrated to be included in the second housing 103 as shown in FIG. 1C, a processor 120 and a memory 130 may be included in the first housing 102 according to design.

Figure 1D:
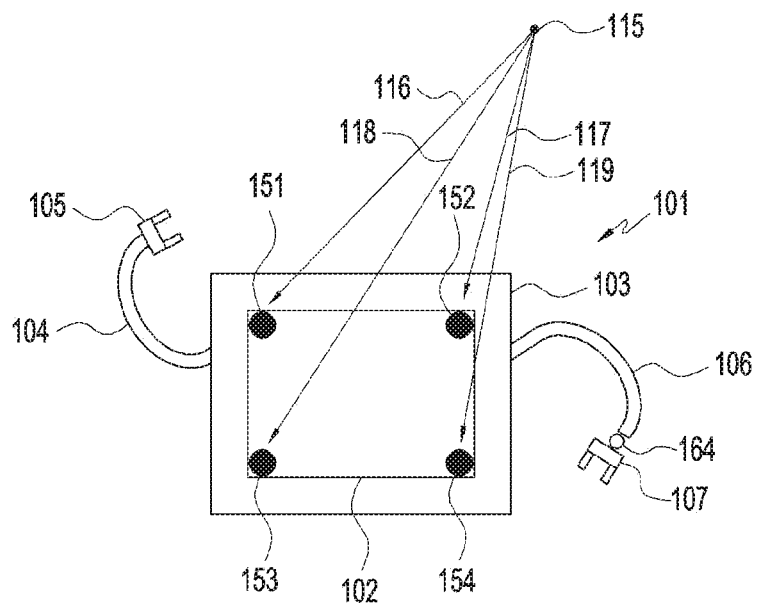
FIG. 1D is a diagram of the arrangement of a plurality of microphones, according to an embodiment.

FIG. 1D is a diagram of the arrangement of a plurality of microphones, according to an embodiment.

Referring to FIG. 1D, microphones 151, 152, 153, and 154 may be located at plural positions of the first housing 102. The first position 115 may be a first distance 116 from the microphone 151, be a second distance 117 from the microphone 152, be a third distance 118 from the microphone 153, and be a fourth distance 119 from the microphone 154. Because the distances are different from each other, a voice generated at the first position 115 may be received by microphones 151, 152, 153, and 154 at respective different time points. The electronic device 101 may determine relative directions of a voice generation position (e.g., the first position 115) with respect thereto, using the time points at which the voice is received by the microphones 151, 152, 153, and 154 (e.g., t1, t2, t3, and t4). The electronic device 101 may relative directions of a voice generation position by using the time difference information of t1-t2, t1-t3, t1-t4, t2-t3, t2-t4, and t3-t4. The electronic device 101 may determine relative directions of a position where a voice has been generated, by using a program or algorithm, stored in the memory, for determining directions. Alternatively, the electronic device 101 may determine relative directions of a voice generation position by using a lookup table stored in the memory 130 and accounting for relations between differences in the time point of voice reception by microphones and directions of voice generation sites. The electronic device 101 may determine relative directions of a voice generation position in various manners including time difference of arrival (TDOA) and frequency difference of arrival (FDOA), and no limitations are imparted to kinds of programs or algorithms used for determination.

Figure 2:
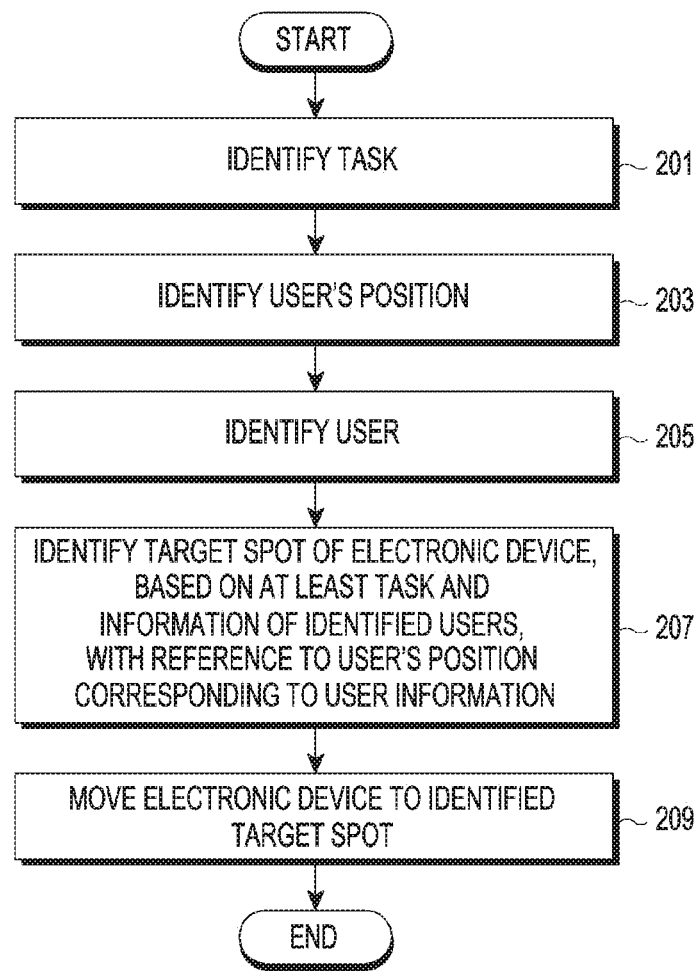
FIG. 2 is a flowchart of an operation of an electronic device, according to an embodiment.
Figure 3A:
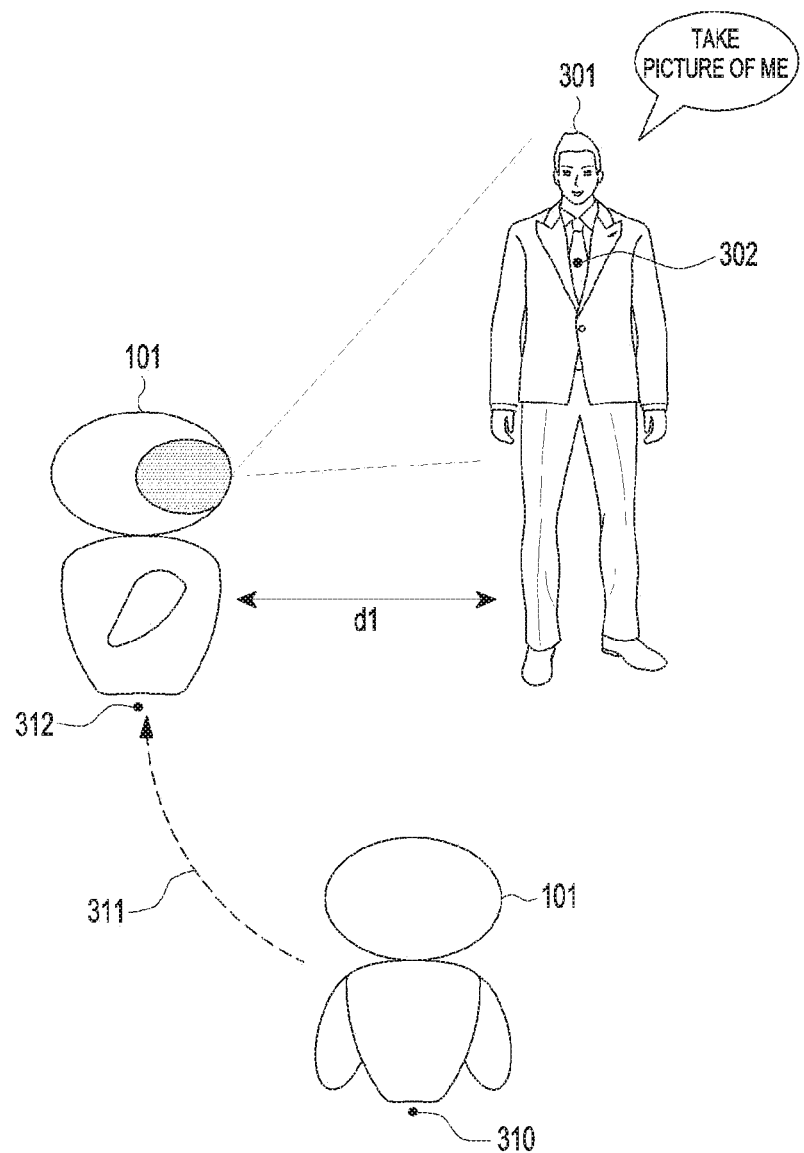
FIGS. 3A and 3B are diagrams of the movement of an electronic device, according to an embodiment.
Figure 3B:
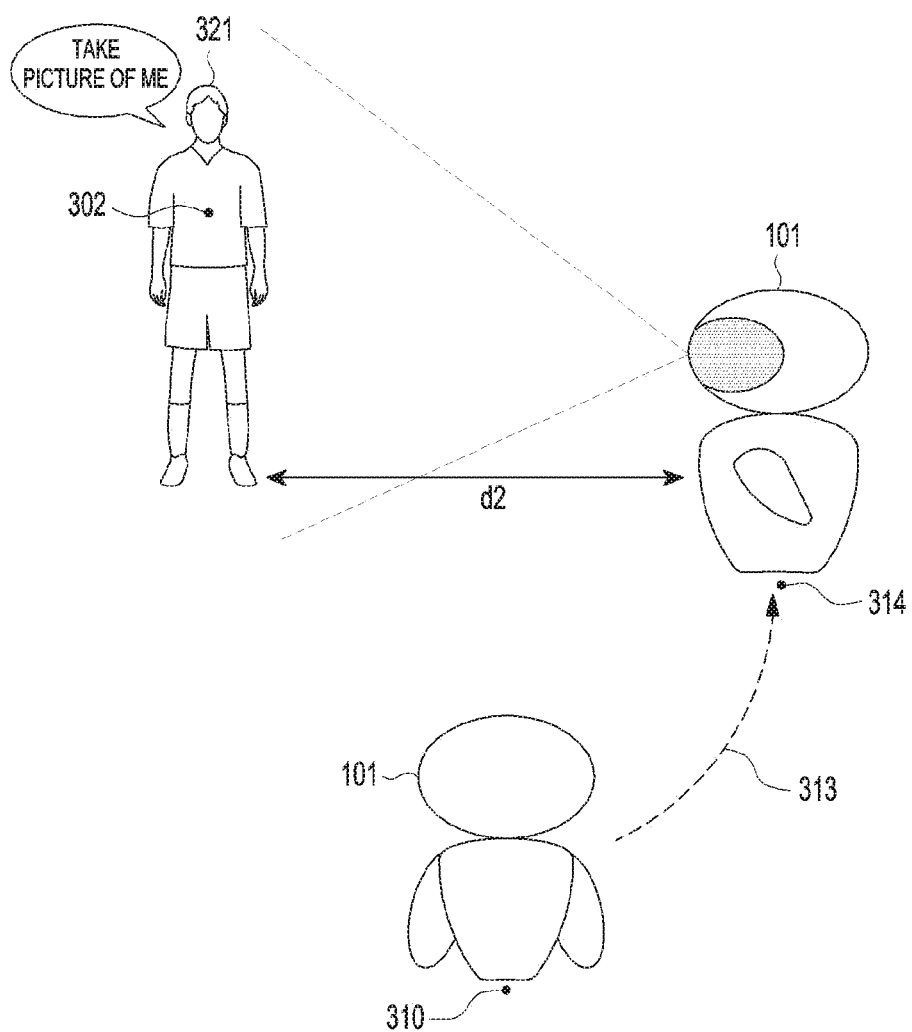

FIG. 2 is a flowchart of an operation of an electronic device, according to an embodiment. FIGS. 3A and 3B are diagrams of the movement of an electronic device, according to an embodiment.

Referring to FIGS. 2, 3A and 3B, an electronic device 101 may identify a task to be performed, at step 201. An electronic device 101 performing a specific operation may include a processor 120 included in the electronic device 101 executing the specific operation, controlling other hardware to perform the specific operation, or performing the specific operation or controlling other hardware to perform the specific operation as at least one instruction stored in a memory 130 included in the electronic device 101 is executed. The electronic device 101 may identify a task corresponding to an acquired voice or to a motion recognition result of the motion of the user.

An electronic device 101 may include a microphone that converts an external voice to an electrical signal and may convert speech generated therearound to electrical signals. The electronic device 101 may remove noise from the electrical signals through various filtration or may amplify electrical signals. The electronic device 101 may analyze electrical signals corresponding to speech and may identify a task corresponding to the speech based on at least the analysis result. The electronic device 101 may apply automatic speech recognition (ASR) to the electrical signal received from a microphone to acquire a text corresponding to the electrical signal. The electronic device 101 may apply natural language understanding (NLU) to an acquired text to obtain an understanding result for the text and may identify a task corresponding to the speech, based on at least the understanding result. The electronic device 101 may apply ASR and NLU to electrical signals corresponding to the speech "take a picture of me" to identify that the task corresponding to the speech is "photographing". The electronic device 101 may pre-process electrical signals acquired from a microphone or may transmit the signals including the electronic signals or pre-processed electronic signal to an external server (not shown) through a communication module 190. The external server may apply ASR and NLU to the electrical signals received from the electronic device 101 and corresponding to voices and may identify a task to be performed by electronic device 101, based on at least the application result. The external server may send information related to the identified task to the electronic device 101 which may then identify the task based on the information received. The external server may send the electronic device 101 a NLU processing result or information on sequential execution procedure of at least one subtask to be sequentially performed by electronic device 101. The electronic device 101 may operate according to the NLU processing result or may perform the subtask according to the sequential execution procedure. Alternatively, the electronic device 101 may apply ASR to electrical signals to acquire a text and may send information on the text to an external server. The external server may apply NLU to the received information relating to the text and may identify a task that the electronic device 101 will perform, based on an application result. The external server may send information on the identified task to the electronic device 101 that may then identify a task on the received information.

The electronic device 101 may identify a task in a manner other than voice recognition. The electronic device 101 may identify a task based on the operation of at least a hardware button or in response to a user's touch on a graphic object, displayed on at least a touch screen, for at least one operation. The electronic device 101 may recognize a user's motion and may identify a task based on motion recognition. The electronic device 101 may include various sensors (e.g., image sensor or ultrasonic sensor) capable of detecting a user's motions and may detect a user's motions based on the data acquired through at least sensors. The electronic device 101 may identify a user's motions based on an analysis result of a plurality of images that have been taken of a user over time. The electronic device 101 may detect a user's motions according to various protocols such as human posture recognition (HPR) based on skeleton data. The electronic device 101 may store correlation information between user's motions and tasks beforehand. The motion that a user clenches his or her right first and opens his or her first may be stored in association with an image photographing task in the electronic device 101 in advance. Thereafter, when detecting the user's motion of clenching and opening his or her right fist, the electronic device 101 may be identified to perform the task of photographing an image. Correlation information between user motions and tasks may be preset in the electronic device 101. A user may perform command for task execution according to the manual provided by the electronic device 101. Correlation information between user motions and tasks may be set by a user. Correlation information between user motions and tasks may differ from one user to another. The electronic device 101 may manage correlation information between user motions and tasks by user identification information. Correlation information between user motions and tasks may be updated. The electronic device 101 may update correlation information between user motions and tasks, depending on feedback results from a user. No limitations are imparted to a sensor detecting user motions or a motion recognition algorithm.

The electronic device 101 may receive a communication signal including information directly expressing a task or at least one piece of information about the operation of the electronic device 101 from a different electronic device. A user may receive a user input for requiring photographing through a different electronic device (e.g., smart phone or wearable electronic device). The different electronic device may send a communication signal including information relevant to user input or a task identified based on user input to the electronic device 101. The different electronic device may perform at least one of ASR and NLU directly or through an external server. The different electronic device may send information relevant to the identified task to the electronic device 101. Alternatively, a user may manipulate a simple electronic device such as a remoter controller. The electronic device 101 may apply the infrared signal received from the remote controller to the present state of the electronic device 101 to identify a task to be performed. The electronic device 101 that is in a volume adjustment state may perform the task of increasing a volume when receiving an IR signal corresponding to the upper direction key on the remote controller. The electronic device 101 that is in a mode selection state may identify the task of "photographing" upon the reception of an IR signal corresponding to the enter key on the remote controller during the direction of an indicator toward a photograph mode. As described above, the electronic device 101 may identify a task based on voice recognition, through an external input, or by receiving a communication signal from the outside and it should be understood to those skilled in the art that no limitations are imparted to the manner in which the electronic device 101 identifies a task. Cameras, microphones, or various sensors through which task execution instructions can be acquired may be referred to as an input device.

The electronic device 101 may visually or acoustically provide a user with a message indicating "message being identified" or a massage for a task identification result through an output unit 170. When receiving correction instruction from a user, the electronic device 101 may perform task identification again. When a user produces the speech "show me pictures of Gangnam", the electronic device 101 may receive the speech and apply ASR to the speech to acquire the text "show me pictures of Gwangnam". The electronic device 101 may identify the task as "display pictures of Gwangnam" and may represent the task identification result. The user may identify a difference between the task identification result and his or her intention and may produce a voice for correcting the task identification result. The user may produce the instruction speech of "Not Gwangnam, but Gangnam". The electronic device 101 may ASR to the voice to acquire the text of "Not Gwangnam, but Gangnam". The electronic device 101 may apply NLU to the acquired text to identify that what the corresponding text means is to change at least part of the task identification result previously identified (e.g., Gwangnam) with a different word (e.g., Gangnam). According to an NLU application result, the electronic device 101 may identify the task as "show me pictures of Gangnam" which is modified by changing "Gwangnam" of "show me pictures of Gwangnam" with Gangnam. The electronic device 101 may display the modified task again and may perform the modified task in response to the reception of certification instruction from the user.

When failing to identify a task, the electronic device 101 may move around the user and may output a message of requesting that the user produce a speech again. When identifying a plurality of tasks corresponding to a speech, the electronic device 101 may output a plurality of candidates and may determine a task based on further user input for selecting at least one of the candidates. The electronic device 101 may output a message of reordering a plurality of candidates or speeches in a dialogue format.

The electronic device 101 may identify a position of a user at step 203. The electronic device 101 may identify a position of a user who produces speech and/or detect a direction where a user's speech is produced. The electronic device 101 may include a plurality of microphones 150 and may identify a direction where a speech is produced, based on a difference in time point at which at least a plurality of microphones receive speech sounds. The electronic device 101 may control its facing direction so as to direct the camera 180 toward where speech is produced. The electronic device 101 may acquire an image photographed by the camera and may identify a position of a user, based on at least an image analysis result. The electronic device 101 may perform scanning in all directions by using the camera 180 and may identify a position of a user, based on at least a scanning result. The electronic device 101 may rotate or move so as to photograph a plurality of indoor sites and may identify a position of a user, based on the photographed images of at least a plurality of indoor sites. The electronic device 101 may recognize a shape of a user, that is, a human from a photographed image and may identify a position of the user based on at least one of a position and a size of at least a recognized object with reference to the electronic device 101 or in the absolute coordinate system in an indoor space. The electronic device 101 may identify at least one of the direction toward or the distance to where a user is positioned, with reference to the present position of the electronic device 101. The electronic device 101 may identify the distance, using an image analysis result or based on the data from at least the sensor 176. The electronic device 101 may identify a coordinate of a user in the absolute coordinate system set forth with reference to one point within the space. The electronic device 101 may identify a position of a user, using the map data of the space where the electronic device 101 exists together with a recognition result from an image. The map data may be implemented as various information such as map data representing positions of barriers, map data representing noise levels, map data representing brightness information, or the like. The electronic device 101 may receive map data from a different electronic device or may produce map data by itself while traveling a plurality of points within the space. When receiving a communication signal, the electronic device 101 may identify a position of a user, based on at least one of information within the received communication signal (e.g., information about the sending strength of a communication signal, the time point of sensing of a communication signal, etc.), receiving strength of a communication signal, a receiving phase of a communication signal, and a time point of receiving of a communication signal. The electronic device 101 may identify and manage positions of users within an indoor environment, periodically or non-periodically and may utilize the positions that have been managed by the time point of task execution. The electronic device 101 may identify a position of a user to respond to the reception of a task execution instruction.

At step 205, the electronic device 101 may identify a user corresponding to a task. The electronic device 101 may identify a user who has produced speech. The electronic device 101 may identify a user who has requested task execution instruction. The electronic device 101 may analyze a photo image of a user and may identify the user, based on an analysis result. The electronic device 101 may apply various recognition algorithms to a photo image to identify a user. The electronic device 101 may identify a user, based on various information acquirable from at least an image, such as face recognition, recognition of user movement patterns, recognition of various bioinformation, etc., and it should be understood to those skilled in the art that no limitations are imparted to a method of discriminating a user by using an image. The electronic device 101 may send a photographed image to an external server and may receive a discrimination result identified by the external server. The electronic device 101 may perform user discrimination in various manners other than the image analysis for a user. The electronic device 101 may analyze collected speech to acquire a voice print and may perform user discrimination, based on an acquired voice print. The electronic device 101 may store in advance information on user candidates who may be positioned within an indoor environment and may identify a user by comparing the information on user candidates with the information extracted from an image. When receiving a communication signal, the electronic device 101 may identify a user based on discrimination information within a communication signal. The electronic device 101 may use various bioinformation (e.g., fingerprint recognition information, iris recognition information, etc.) obtained with the sensor module 176 to identify a user. The electronic device 101 may identify a user relevant to task execution, but not a user who produced a voice or manipulated to send a communication signal. When a first user produces the speech "take a picture of a second user", the electronic device 101 may not search for the first user who produced the speech, but may identify a position of the second user relevant to the task. The electronic device 101 may determine a identifying target and subsequently search for an object matching with the identifying target within the image. Using the search result, the electronic device 101 may identify a position of the second user.

At step 207, the electronic device 101 may identify a target spot thereof, based on at least the task and information of identified users, with reference to the position of a user corresponding to user information. The electronic device 101 may move to the identified target spot at step 209. The electronic device 101 may use information on preference positions for task execution by users to identify a target spot of the electronic device 101 with reference to a position of a user. The electronic device 101 may store the information as set forth in Table 1 beforehand

TABLE 1

| Kind of Task | User identification information | Preference position for task execution |
| --- | --- | --- |
| Photographing | Tom | direction (θ1, φ1), distance d1 |
| | Teddy | direction (θ2, φ2), distance d2 |

User preference positions where the electronic device 101 executes a task as in Table 1 may be set forth by users or produced by the electronic device 101 or an external electronic device. A detailed description will be given of the procedure of producing the information as in Table 1. A first user 301 produces the speech "take a picture of me", as illustrated in FIG. 3A. The electronic device 101 may be positioned at a first spot 310 and may identify the first user 301 as "Tom". The electronic device 101 may identify the position of the first user 301 as a second spot 302. The electronic device 101 may identify the direction in which the face of the first user 301 is facing as well as the spot of the first user 301. The electronic device 101 may identify that the preference position of the first user 301 "Tom" at which a task will be executed is the spot having "direction (θ1, φ1), distance d1" with respect to the position of the user. The electronic device 101 is spaced by a first distance d1 from a second spot 302 at which the first user 301 is being positioned and may move (311) to a third spot 312 which is in the (θ1, φ1) direction with respect to the direction in which the face of the first user 301 is facing. In addition, the electronic device 101 may rotate at the third spot 312 such that the electrode device 101 faces in the direction (θ1, φ1) relative to the direction in which the face of the first user 301 is facing. The electronic device 101 may perform at least one of movement and rotation such that a camera of the electronic device 101 faces in the direction (θ1, φ1) relative to the direction in which the face of the first user 301 is facing. As shown in FIG. 3B, the electronic device 101 may identify the speech "take a picture of me" that the second user 321 produced. The electronic device 101 may stand at a first spot 310 and may identify the second user 321 as "Teddy". The electronic device 101 may identify the position of the second user 321 to be a second spot 302. The electronic device 101 may identify the direction in which the face of the second user 321 is facing. The electronic device 101 may identify that the preference position of the second user 321 "Teddy" at which a task will be executed is the spot having "direction (θ2, φ2), distance d2" with respect to the position of the user. The electronic device 101 is spaced by a second distance d2 from the second spot 302 at which the second user 321 is being positioned and may move (313) to a fourth spot 314 which is in the (θ2, φ2) direction with respect to the direction in which the face of the second user 321 is facing. In addition, the electronic device 101 may rotate at the fourth spot 314 such that the electrode device 101 faces in the direction (θ2, φ2) relative to the direction in which the face of the second user 321 is facing.

When different users who are standing at the same position, facing in the same direction request the same task, as described above, the electronic device 101 may move to task execution spots different for the users. Therefore, an electronic device 101 capable of executing a task at positions respectively optimized for users and an operation method thereof are provided. The electronic device 101 includes a processor 120 that may generate and store information as in Table 1. Alternatively, an external electronic device (e.g., server) may generate and store information as in Table 1. The electronic device 101 may send a photographing result or user identification information to the external electronic device. The electronic device 101 or an external electronic device may perform a particular task for a specific user multiple times under various conditions. The electronic device 101 may identify scores for corresponding task execution conditions by direct feedback from the user or factors indicating user preference (e.g., delete of image, social network service (SNS) uploading, etc.). The electronic device 101 may consistently monitor the activity of users and may identify scores or update scores, based on a monitoring result. The electronic device 101 may identify or update scores in response to the activity of users, such as SNS uploading of photographed images, image transmission to other electronic devices, image elimination, etc. When reproducing music, the electronic device 101 may identify the concentration of a user into the music and may identify or update a score, based on the identification result. The electronic device 101 may identify relatively high concentration of a user when the motion of the user is less than a threshold value as analyzed with photographed images. The electronic device 101 may identify the concentration of a user based on a period of reproduction time of music without skipping the music. The electronic device 101 may identify scores according to user identification information. The electronic device 101 may provide a relatively high weight for a user identified as the owner of the electronic device 101 upon score identification and a relatively low weight for a user other than the owner upon score identification.

The electronic device 101 may generate correlation information as in Table 1 based on feedback for each of various task execution conditions. The procedure in which the electronic device 101 generates correlation information as in Table 1 will be described in greater detail below.

An external electronic device may identify a user by analyzing received photographic results or may identify at least one of optimal task execution positions and directions in response to received discrimination information. When an external electronic device sends at least one of the task execution position and direction identified by the electronic device 101, the electronic device 101 may execute at least one of motion and rotation, based on the received information.

The electronic device 101 may fail to identify a user at step 205. For example, the electronic device 101 may identify that face recognition information analyzed from a photographed image or voice information is not registered beforehand. The electronic device 101 may perform a task according to a preset initial condition or a random condition. The electronic device 101 may operate according to a task execution condition set forth for a user who has attributes similar to analyzed recognition information (e.g., an extent of similarity of face recognition, or voice information). The operation of the electronic device 101 upon above-mentioned user identification failure will be described in greater detail with reference to FIGS. 8A and 8B.

Figure 3C:
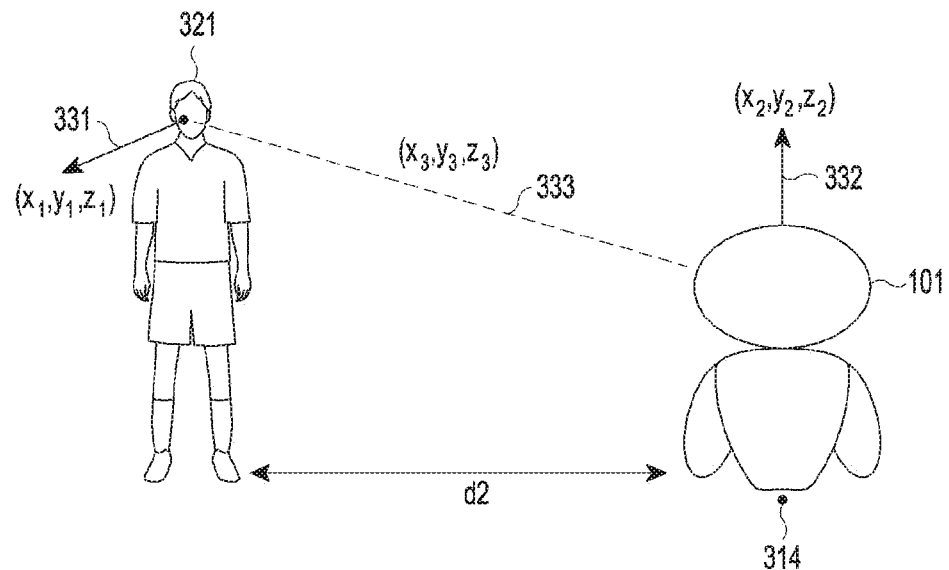
FIGS. 3C and 3D are diagrams of the rotation of an electronic device for task execution, according to an embodiment.
Figure 3D:
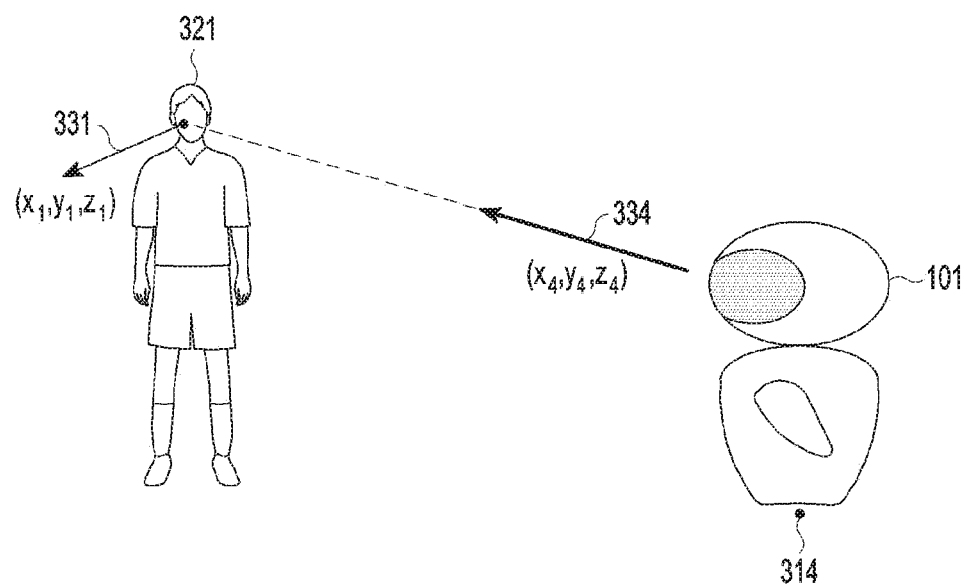

FIGS. 3C and 3D are diagrams of the rotation of an electronic device for task execution, according to an embodiment.

Referring to FIGS. 3C and 3D, the electronic device 101 may move to a fourth spot 314 as in FIG. 3B. When moves to the fourth spot 314, the electronic device 101 may face a second direction 332. The second direction (x2,y2,z2) may be expressed as a vector in the absolute coordinate system, but it will be understood to those skilled in the art that no limitations are imparted to expression types of directions. The electronic device 101 may identify that the second user 321 is facing in the first direction 331 (e.g., direction of vector (x1,y1,z1)). The electronic device 101 may analyze photo images of the second user 321 to recognize the face of the second user 321, together with objects within the face (e.g., left eye, right eye, nose, and lips). Based on at least one of the morphologies and relative positional relations of the objects, the electronic device 101 may identify that the second user 321 is facing in the first direction 331. The electronic device 101 may identify the first direction 331 in which the second user 321 is facing, according to various protocols such as HPR based on skeleton data.

As described above, the electronic device 101 may identify a task execution condition corresponding to the second user 321. The electronic device 101 may identify that the photographing angle corresponding to the second user 321 has a direction (θ2, φ2) as given in Table 1. The electronic device 101 may identify a third direction 331 resulting from applying the direction (θ2, φ2) with reference to the first direction 331, and the third direction may be expressed as a vector (x3,y3,z3) in the absolute coordinate system. The electronic device 101 may absolute coordinates of the vector (x3,y3,z3) with reference to at least one spot on the face of the second user 321. The electronic device 101 may let at least part of the housings thereof rotate, as shown in FIG. 3D, such that the electronic device 101 turns from the second direction 332 illustrated in FIG. 3C to a fourth direction 334. The fourth direction 334 may be the same as or inverse to the third direction 333 illustrated in FIG. 3C. The electronic device 101 may control the rotation such that a camera of the electronic device 101 faces in a designated photographing direction with reference to the direction in which the second user 321 is facing. The electronic device 101 may primarily perform at least one of movement and rotation, based on at least designated information. After performing at least one of movement and rotation, the electronic device 101 may further perform at least one of movement and rotation while photographing the user until a predesignated image of an object or a correlation between objects is detected. The electronic device 101 may additionally perform at least one of movement and rotation, based on a predesignated pattern. The electronic device 101 may analyze shapes of objects or relative positions among objects on images to identify at least one of an extent of movement and an extent of rotation which should be conducted in order to acquire predesignated shapes of objects or predesignated relative positions between objects on images and may further perform at least one of movement and rotation, based on the identification result.

When detecting a task execution instruction, the electronic device 101 may first move toward a user corresponding to the task execution instruction and then may identify a correct spot. The electronic device 101 may be initially disposed at a spot where the user's facing direction is difficult to correctly identify. When located behind a user, the electronic device 101 cannot identify the user's facing direction because the electrode device 101 is unable to photograph the user face. The electronic device 101 may have difficulty in identifying a target spot with reference to a user's facing direction. The electronic device 101 may primarily move to a spot where information necessary for identifying a task execution condition can be obtained. When the electronic device 101 has to identify a user's facing direction, the electronic device 101 may move a spot allowing the photographing of the user's face, above all. The electronic device 101 may analyze a photographed image as an appearance from behind and may move to a spot in front of the user. After the primary movement, the electronic device 101 may acquire information necessary for determining a task execution condition (e.g., a face image of the user) and may identify a target spot, based on the acquired information. The electronic device 101 may move to the identified target spot and may perform rotation according to the task execution condition. The electronic device 101 may photograph a user before completion of the movement and may identify a target spot during the movement. The electronic device 101 may change the route along which it is traveling to a route to a target spot and may move along the changed route.

Figure 4A:
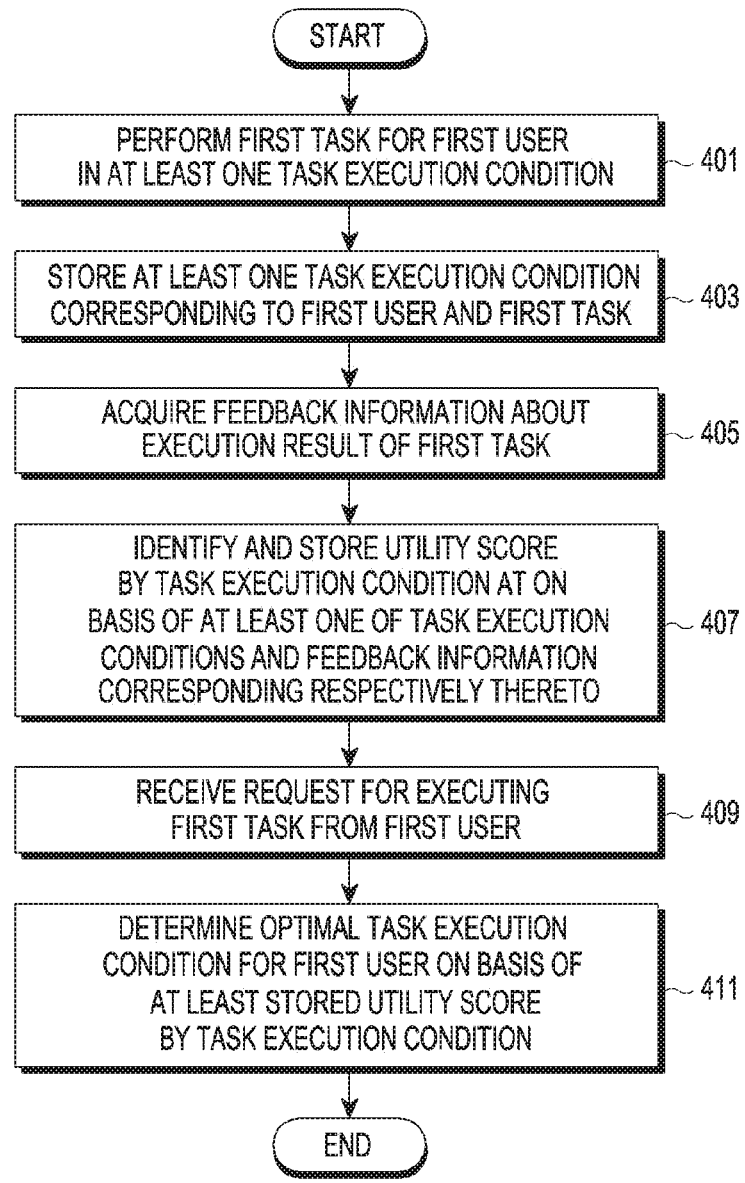
FIG. 4A is a flowchart of an operation of an electronic device, according to an embodiment.
Figure 5A:
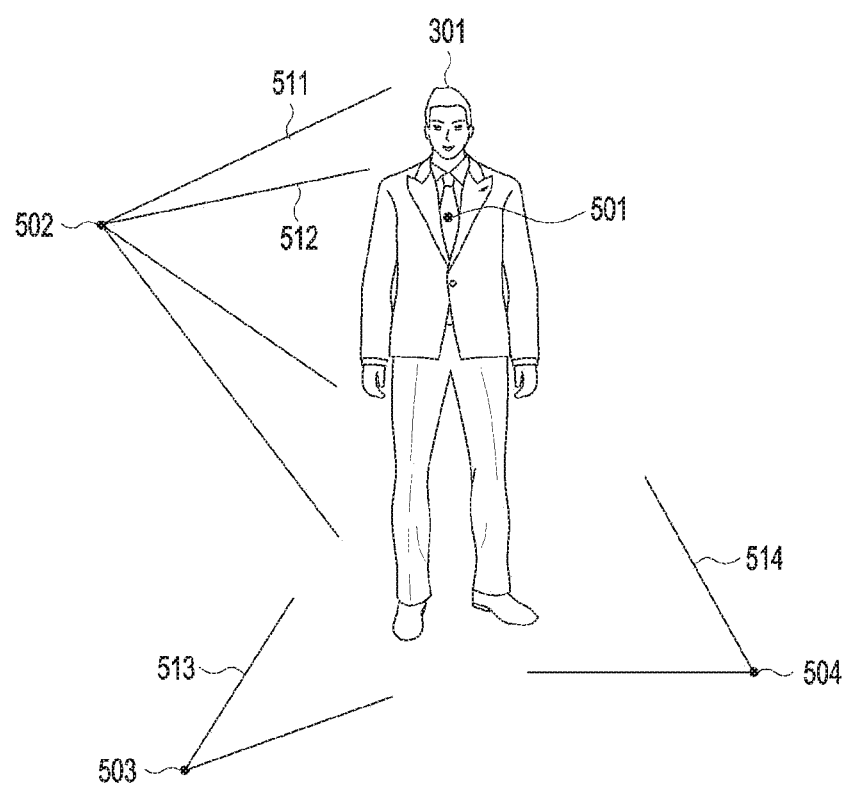
FIG. 5A is a diagram of task execution in at least one task execution condition, according to an embodiment.
Figure 5C:
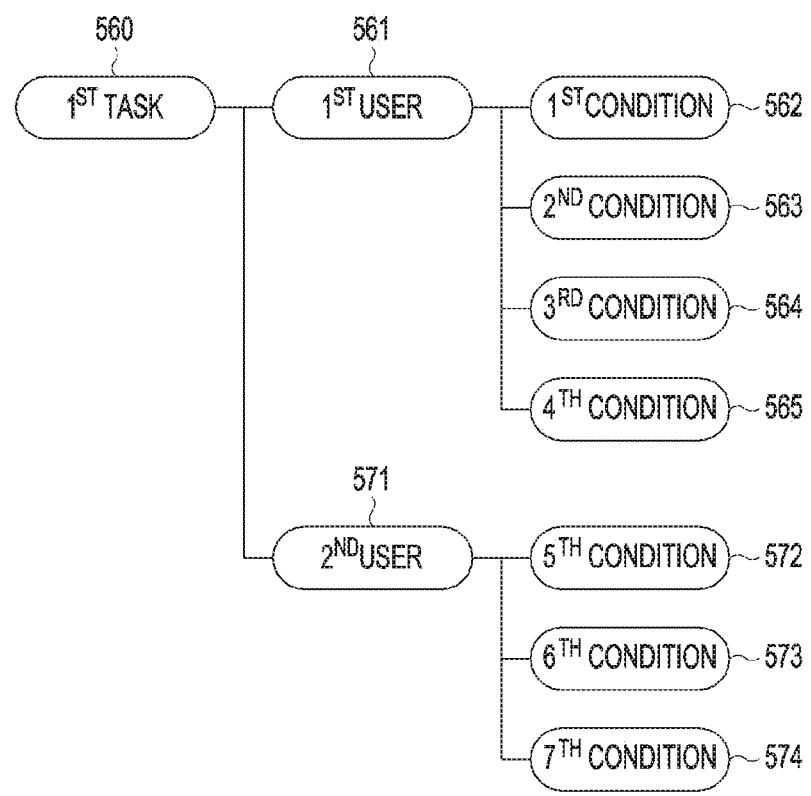
FIG. 5C is a diagram of task execution conditions for a task by users, according to an embodiment.

FIG. 4A is a flowchart of an operation of an electronic device, according to an embodiment. FIG. 5A is a diagram of task execution in at least one task execution condition, according to an embodiment. FIG. 5B is a diagram of a database of task execution results, according to an embodiment. FIG. 5C is a diagram of task execution conditions for a task by users, according to an embodiment.

Referring to FIGS. 4A, 5A, 5B, and 5C, the electronic device 101 may perform a first task for a first user in at least one task execution condition at step 401. At step 403, the electronic device 101 may store at least one task execution condition corresponding to the first user and the first task. At step 405, the electronic device 101 may acquire feedback information about an execution result of the first task. As shown in FIG. 5A, the electronic device 101 may acquire a first image by photographing a first user 301 located at a first spot 501 in a first photographing direction 511 at a second spot 502. The electronic device 101 may store first information 541 corresponding to the first image 531, as shown in FIG. 5B. The database of photograph task execution results, as shown in FIG. 5B, may include task execution information 530 such as a direction in which the electronic device 101 was present with reference to the direction in which the front plane of a subject for photography (e.g., user's face) faced, a distance by which the electronic device 101 was spaced from the subject, a photographing direction in which a camera was facing with reference to the direction in which the front plane of a subject was facing, etc., and feedback information 540 corresponding to each task execution result. It should be understood to those skilled in the art that the task execution information on the direction, the distance, and the photographing direction, shown in FIG. 5B, is illustrative and may further other task execution information such as photographing time, brightness of surroundings, whether to use flash, ages and gender of users, etc. and some of the task execution information of FIG. 5B may be excluded. The electronic device 101 may store as first information 541 corresponding to the first image 131 the information about a direction ($\theta 1, \varphi 1$) in which the electronic device 101 was present, a distance X1 by which electronic device 101 was spaced from the user, a photographing direction ($\theta 5, \varphi 5$), and the feedback information of "delete" corresponding thereto. As shown in FIG. 5A, the electronic device 101 may take pictures in each of various spots 502, 503, and 504 at various photographing angles 512, 513, and 514 to acquire various images 532, 533, and 534. The electronic device 101 may store second information 542, third information 543, and fourth information 544 including various task execution conditions and feedback information by images 532,533, and 534.

The feedback information 540 may include various information allowing for identifying the preference of images, such as image delete, SNS uploading, positive feedback reception, SNS feedback reception, etc. Various information, although not shown, including "user's looks allowing the identification of preference", "user's speech allowing the identification of preference", "user's inputs allowing the identification of preference", "direct correction instruction", "user's frequency of using tasks of interest, etc. may be utilized as feedback information. The term "direct correction instruction" may refer to a user's command to directly correct a particular task execution condition. When the electronic device 101 take a picture at a particular position, the user may produce an instruction to directly correct a task execution condition with the intention of "No, more to the left". The electronic device 101 may identify that the task execution condition of the particular photographing position at which a picture will be taken has negative feedback. In addition, the electronic device 101 may receive a task execution condition directly input by a user and may impart a relatively high score to the task execution condition. The feedback information 540 may be expressed as the binary score of good/bad. Here, the score may be referred to as utility score which may mean an index indicative of the utility of user. "SNS upload", or "receiving positive feedback" may correspond to the score of "good" while "image elimination" may correspond to the score of "bad". As for "SNS feedback", it may be identified as the score of "positive when the number of "like it" received from different SNS accounts exceeds a threshold value, and may be identified as the score of "negative" when the number of "like it" is a threshold value or less. The feedback information 540 may include contents of various events as shown in FIG. 5B (e.g., image elimination, SNS uploading, receiving positive feedback, or receiving SNS feedback). The electronic device 101 may identify events of interest as scores having various numeral values. The electronic device 101 may impart a relatively high numeral score to the feedback of "SNS uploading" and a relatively low numeral score to the feedback of "image elimination". The electronic device 101 may store correlation information between various feedback information and scores beforehand and may utilize the stored correlation information to identify a score for feedback information.

The electronic device 101 may identify and store utility scores by task execution conditions at step 407 based on at least one of the task execution conditions and feedback information corresponding respectively thereto. The electronic device 101 may receive request for executing the first task from the first user at step 409. At step 411, the electronic device 101 may determine an optimal task execution condition for the first user based on at least the stored utility scores by task execution conditions. The electronic device 101 may perform clustering for various ask execution conditions and feedback information (e.g., scores) such as those in FIG. 5B and thus, similar task execution conditions may cluster. The electronic device 101 may determine the task execution condition for a cluster having a relatively high score among the clusters of the task execution conditions as an optimal task execution condition for the first user. The electronic device 101 may set an optimized task execution condition within the range of the task execution conditions or as a representative value of the clusters (e.g., mean, median, etc.). The electronic device 101 may classify the task execution conditions based on at least various learning models and may identify optimal execution conditions by users based on scores corresponding to at least the classified task execution conditions.

For an adult user, the electronic device 101 may perform a task of outputting a stored story in voice at a position spaced apart by a first distance therefrom as set beforehand. For a child user, the electronic device 101 may perform a task at a position spaced apart by a second distance shorter than the first distance and may make an additional operation, such as keeping eye contact therewith.

The electronic device 101 may store task execution conditions by users (e.g., a first user 561 and a second user 571) for the first task 560, as shown in FIG. 5C. For the first user 561, the electronic device 101 may store a first condition 562 with first priority, a second condition 563 with second priority, a third condition 564 with third priority, and a fourth condition 565 with fourth priority. When the first task 560 is "photographing", each of the first condition 562 to the fourth condition 565 may include a condition identified in the course of performing at least one task (e.g., electronic device 101 and distance to a subject, a direction in which the electronic device 101 is present with respect to a subject, a photographing angle of the electronic device 101, etc.). The conditions may vary depending on kinds of tasks. In addition, each of the first condition 562 to the fourth condition 565 may be expressed as a single value or a designated range. The electronic device 101 may identify task execution conditions in the order of priority rank. When the first condition 562 with the first priority cannot be implemented, the electronic device 101 may determine a task execution condition with the next priority. The electronic device 101 may store a fifth condition 572 with first priority, a sixth condition 573 with second priority, and a seventh condition 574 with third priority for the second user 571. The first condition 562 may be different from the fifth condition 572.

An electronic device 101 may utilize an analysis result of a photographed image other than physical factors at the time point of photographing, such as position, direction, photographing direction, etc., as a task execution condition. The electronic device 101 may classify images based on shapes of each of various objects (e.g., gaze, nose, lips, face, and neck) included in at least an image analysis result or on relative positions of the objects. The electronic device 101 may utilize various image classification learning models to classify images. The electronic device 101 may identify optimal object-related information (e.g., shapes and relative positions of objects) based on the feedback information for the classified images. The electronic device 101 may perform at least one of movement or rotation according to an identified user in order to detect optimal object-related information. The electronic device 101 may take preview images of an identified user while performing at least one of movement, rotation, and photographing direction turning. The electronic device 101 may perform at least one of movement, rotation, and photographing direction turning until an identified optimal object-related information is detected from the preview images. When object-related information having a similarity of higher than a threshold value with a stored, optimal object-related information is detected through the preview images, the electronic device 101 may non-transitorily store the corresponding preview image. When an image analysis result obtained through preview images is determined to meet a stored condition, the electronic device 101 may store the corresponding image. The electronic device 101 may take an additional image in the corresponding task execution condition and may provide a countdown to additional photographing to afford a time for which the user can take a pose. The electronic device 101 may store optimal object-related information (e.g., shapes and relative positions of objects) by users. The electronic device 101 may store information on shapes or relative positions of objects appearing upon photographing at a left upper side of the first user as optimal object-related information for the first user and information on shapes or relative positions of objects appearing upon photographing at a right lower side of the second user as optimal object-related information for the second user. In response to the photographing request of the first user, the electronic device 101 may perform at least one of movement and rotation until similarity equal to or higher than a threshold value is identified between designated object shapes or relative position correlation between objects and the object-related information obtained through the preview images. When object-related information with similarity of a threshold value or higher is detected, the electronic device 101 may non-transitorily store the image. The electronic device 101 may utilize all the information as in FIG. 5C and the object-related information. The electronic device 101 may utilize the information as in FIG. 5C to perform at least one of movement and rotation and subsequently at least one of additional movement and rotation, based on the object-related information.

Figure 4B:
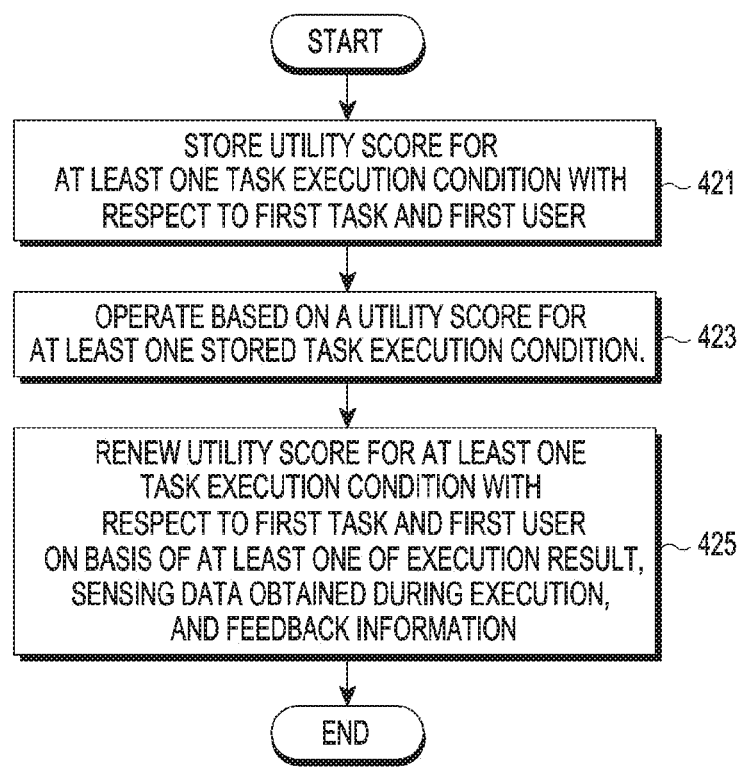
FIG. 4B is a flowchart of an operation of an electronic device, according to an embodiment.

FIG. 4B is a flowchart of an operation of an electronic device, according to an embodiment.

Referring to FIG. 4B, the electronic device 101 may store a utility score for at least one task execution condition with respect to a first task and a first user, at step 421. The electronic device 101 may operate based on a utility score for at least one stored task execution condition, at step 423. At step 425, electronic device 101 may update a utility score for at least one task execution condition with respect to the first task and the first user based on at least one of an execution result, sensing data obtained during execution, and feedback information. The electronic device 101 may perform a task according to a previously stored optimal task execution condition and may then receive negative feedback thereto. The electronic device 101 may determine a task execution condition with the subsequent priority as a task execution condition to be performed, based on the negative feedback or may make reclassification of the database including the negative feedback to update utility scores. Thus, the information may be updated as shown in FIG. 5C. With the expansion of database capacity, the information as in FIG. 5C may converge on the task execution condition reflecting intentions of users.

Figure 6:
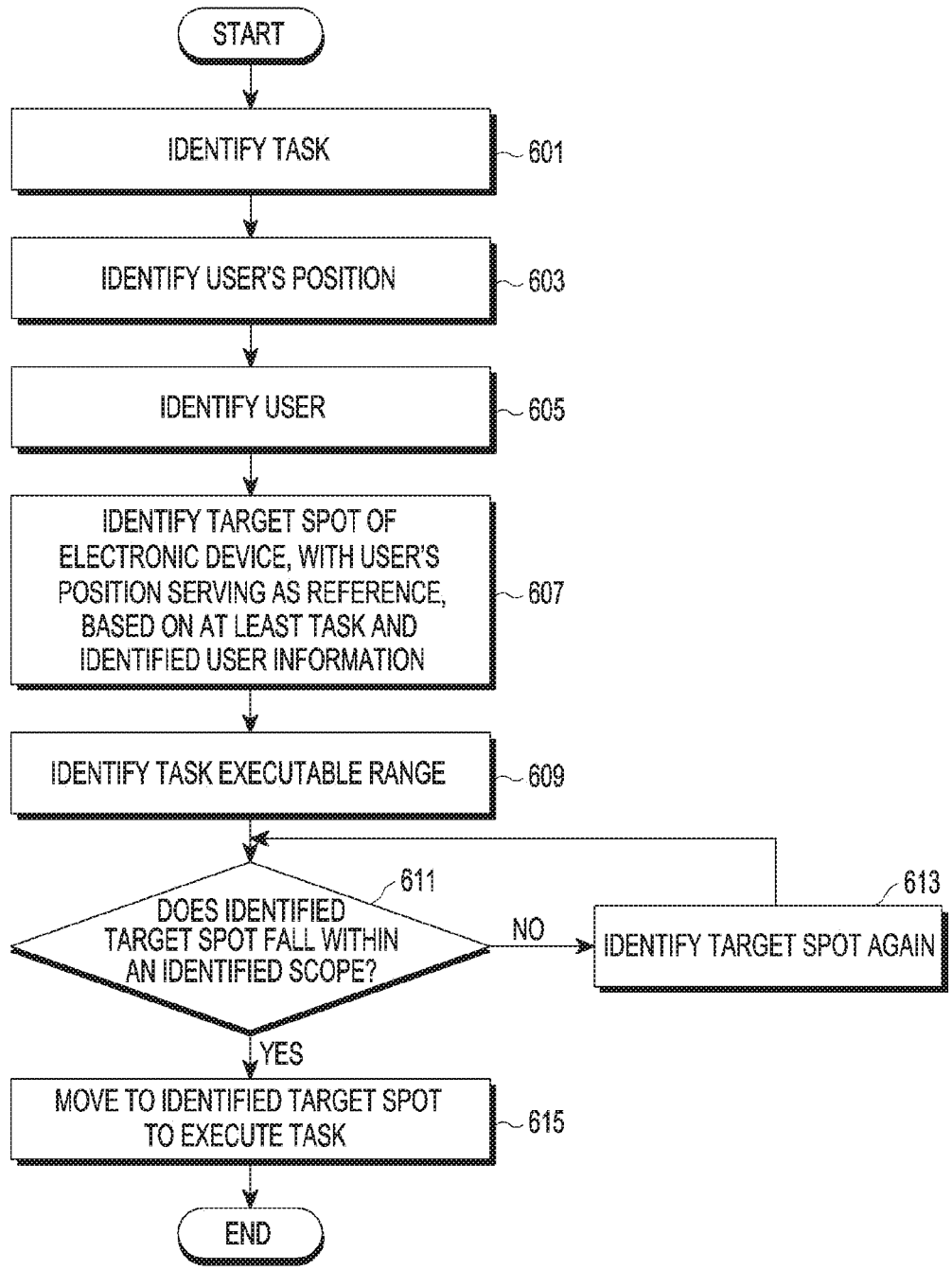
FIG. 6 is a flowchart of an operation of an electronic device, according to an embodiment.
Figure 7:
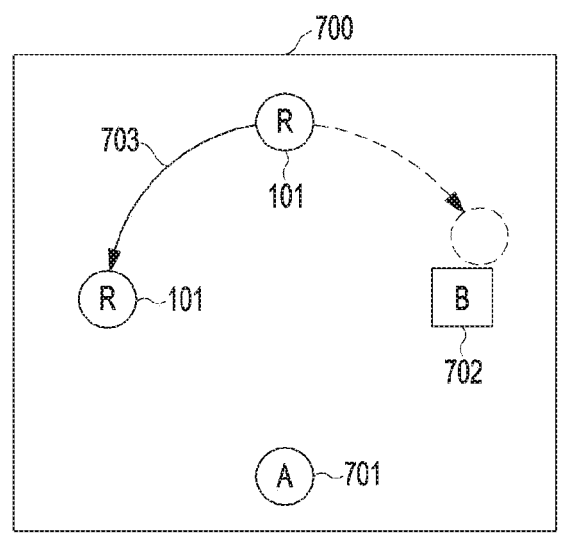
FIG. 7 is a diagram of the movement of an electronic device in an indoor environment, according to an embodiment.

FIG. 6 is a flowchart of an operation of an electronic device, according to an embodiment. FIG. 7 is a diagram of the movement of an electronic device in an indoor environment, according to an embodiment.

Referring to FIGS. 6 and 7, the electronic device 101 may identify at step 601 a task to be performed. At step 603, the electronic 101 may identify a position of a user. At step 605, the electronic device 101 may identify a user related to a task. At step 607, the electronic device 101 may identify a target spot thereof, with respect to the position of a user, based on at least the task and the identified user information. That is, the position of the user may the reference position for identifying relative position of the electronic device 101. The electronic device 101 may identify a target spot thereof while the position of a user corresponding to user information serves as a reference. The electronic device 101 may identify a task execution spot based on preset task execution conditions such as in FIG. 5C, with the position of a user serving as a reference. The electronic device 101 may identify a user 701 as the first user 561, as shown in FIG. 7. The electronic device 101 may select a first condition 562 which is designated with first priority among a plurality of stored task execution conditions corresponding to the first user 561. The electronic device 101 may identify a target spot thereof by applying the first condition 562, with the present position of the user 701 serving as a reference.

At step 609, the electronic device 101 may identify whether the identified spot falls within a scope which allows for task execution. The electronic device 101 may identify whether the spot is within a task executable scope, depending on whether the electronic device 101 can move to the spot or not. Since the electronic device 101 cannot move to a region in which an object 702 exists, the electronic device 101 identifies the region occupied by the object 702 as a region to which movement is impossible, and the region is excluded from a task executable scope. The electronic device 101 may scan surroundings to get and store the position of an object 702 in advance or may identify whether an object exists, upon the time point of a request for task execution instruction. The electronic device 101 may store in advance map data for positions of objects (e.g., object 702) arranged beforehand in an indoor environment 700 and may use the map data to identify a task executable scope.

The electronic device 101 may identify a task executable scope set forth according to a kind of task. For a task of displaying a specific screen it may be requested that a user be present within such a distance from the electronic device or within such a viewing angle with respect to the electronic device 101 as to see the screen. A scope within which a task of displaying a screen is executable may be designated a specific distance or shorter and a specific viewing angle or smaller. For a task of outputting specific audio information it may be requested that a user be present within such a distance from the electronic device 101 as to allow for hearing. A scope within which a task of outputting audio information can be executed may be designated a particular distance or shorter from the electronic device 101. The electronic device 101 may store or identify in advance scopes by task kind within which various tasks can be executed, such as a scope corresponding to a task of providing physical information, such as haptic, a scope corresponding to a task of receiving an input from a user, etc. The above-described scope within which various tasks can be executed may be determined not only by task kinds, but also by various factors including positions of a user (e.g., user's position in the absolute coordinate system, user's position relative to electronic device 101 as a reference, etc.), directions in which a user is facing (e.g., directions of user's face, body, ears, etc.), states of a user (where or not a user watches a specific spot, activity of a user, interaction of a user, etc.), conditions of external environments (e.g., noise level, presence or absence of a barrier, humidity, temperature, brightness, etc.). In addition, the task executable scope may be determined, based on the state of the electronic device 101 (e.g., a size of a process being treated in the electronic device 101, residual power, etc.)

The electronic device 101 may identify a task executable scope, based on states of a user. The electronic device 101 may identify that a user is watching a specific object. The electronic device 101 may analyze a user's gaze while photographing the user. When the user's gaze are detected to not move at a frequency of a threshold value or higher as a result of analysis, the electronic device 101 may identify that the user is watching a specific object. The electronic device 101 may exclude a scope corresponding to the user's gaze from a task executable scope. When a user is interacting with another user, the electronic device 101 may correspondingly exclude a scope interfering with interaction from a task executable scope. The electronic device 101 may infer a scope of user's interaction or a degree of user's concentration based on learning or may determine the same based on rules. These two methods may be used in combination to identify the scope or the degree. The electronic device 101 may analyze photo images of a user or surroundings thereof to identify a scene context or may segment the images at an object level to identify kinds, scopes, and directions of interaction between the user and the segmented objects. The electronic device 101 may use a database of preexisting execution results to identify task executable scopes by user identification information or by user's state. Accordingly, a task executable scope by user identification information or by user's state may be established.

The electronic device 101 may identify, at step 611, whether or not an identified target spot is within an identified scope. Unless an identified target spot exists within an identified scope, the electronic device 101 may identify a target spot again, at step 613. When an identified target spot is identified to exist within an identified scope, the electronic device 101 moves to the identified target spot at step 615 to execute a task. The electronic device 101, as shown in FIG. 7, may identify that a primarily identified target spot belongs to a scope excluded from a task executable scope due to the arrangement of an object 702. The electronic device 101 may secondarily identify a target spot again. The electronic device 101 may identify a target spot again, based on a task execution condition set forth to have at least the next priority. When the re-identified target spot is discovered to be within a task executable scope, the electronic device 101 may move (703) to the identified spot. The electronic device 101 may receive a task execution condition directly from a user. The electronic device 101 may operate according to the direct task execution condition.

Figure 8A:
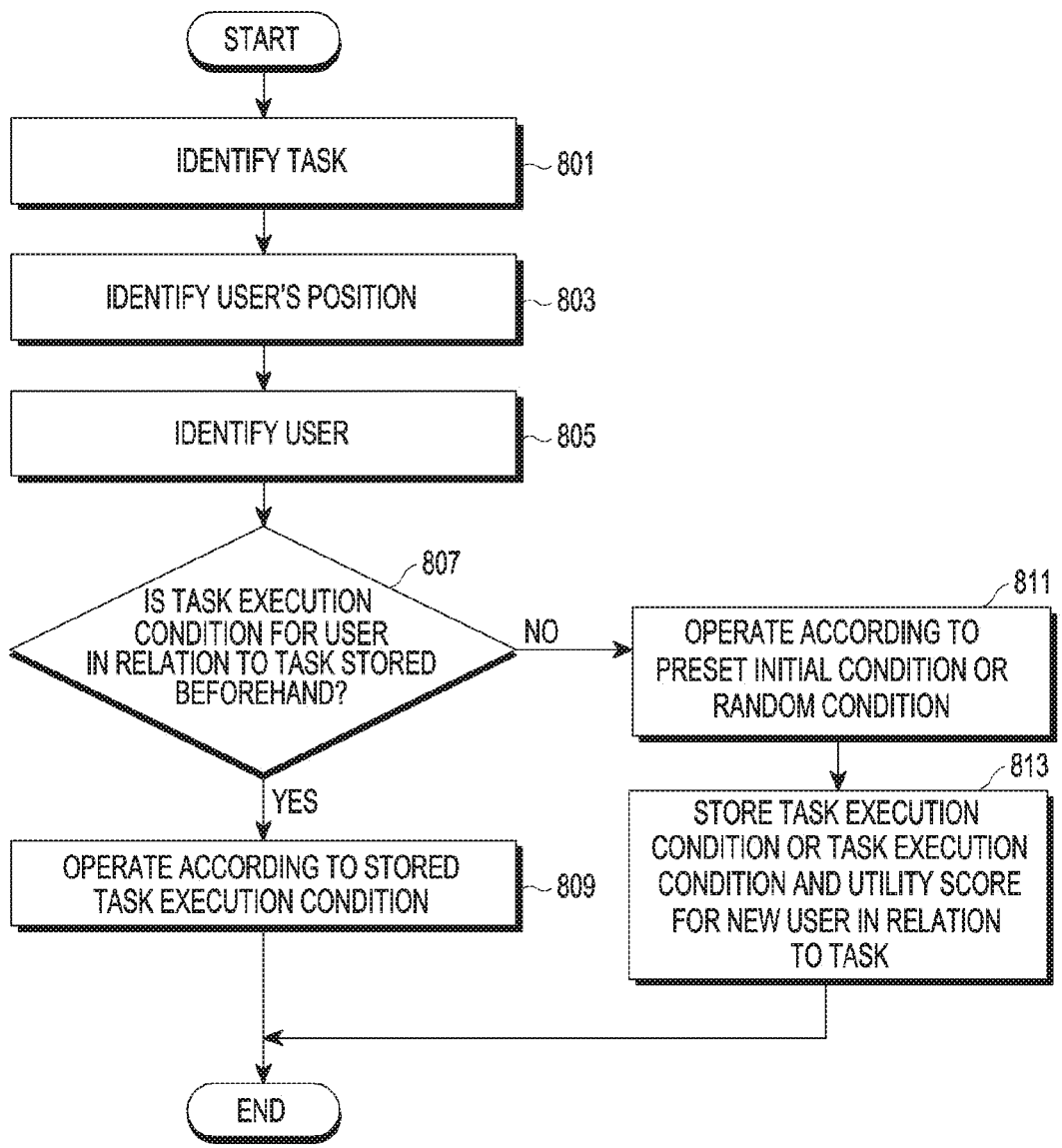
FIG. 8A is a flowchart of an operation of an electronic device, according to an embodiment.

FIG. 8A is a flowchart of an operation of an electronic device, according to an embodiment.

Referring to FIG. 8A, the electronic device 101 may identify, at step 801, a task to be performed. The electronic device 101 may identify a position of a user at step 803. The electronic device 101 may identify a user in relation to a task at step 805. At step 807, the electronic device 101 may identify whether a task execution condition for a user in relation to a task is stored beforehand. The electronic device 101 may use information as in FIG. 5C to identify whether or not information on users identified in relation to identified tasks is stored or not. When a task execution condition for a user identified in relation to a task is identified to be stored beforehand, the electronic device 101 may operate at step 809 according to the stored task execution condition. When a task execution condition for a user identified in relation to a task is identified to be not stored beforehand, the electronic device 101 may operate at step 811 according to a preset initial condition or random condition. The electronic device 101 may identify a preset initial condition for each task and may execute a task according to the initial condition when there are no task execution conditions particularly stored for a user. The electronic device 101 may execute a task according to a random condition. The electronic device 101 may operate according to a preset initial condition or random condition at step 811 when the user identification at step 805 fails. At step 813, the electronic device 101 may store a task execution condition or a task execution condition and a utility score for a new user in relation to a task. The electronic device 101 may acquire feedback to a task executed according to a preset initial condition or a random condition and may use the feedback to store a task execution condition and a utility score for a new user.

Figure 8B:
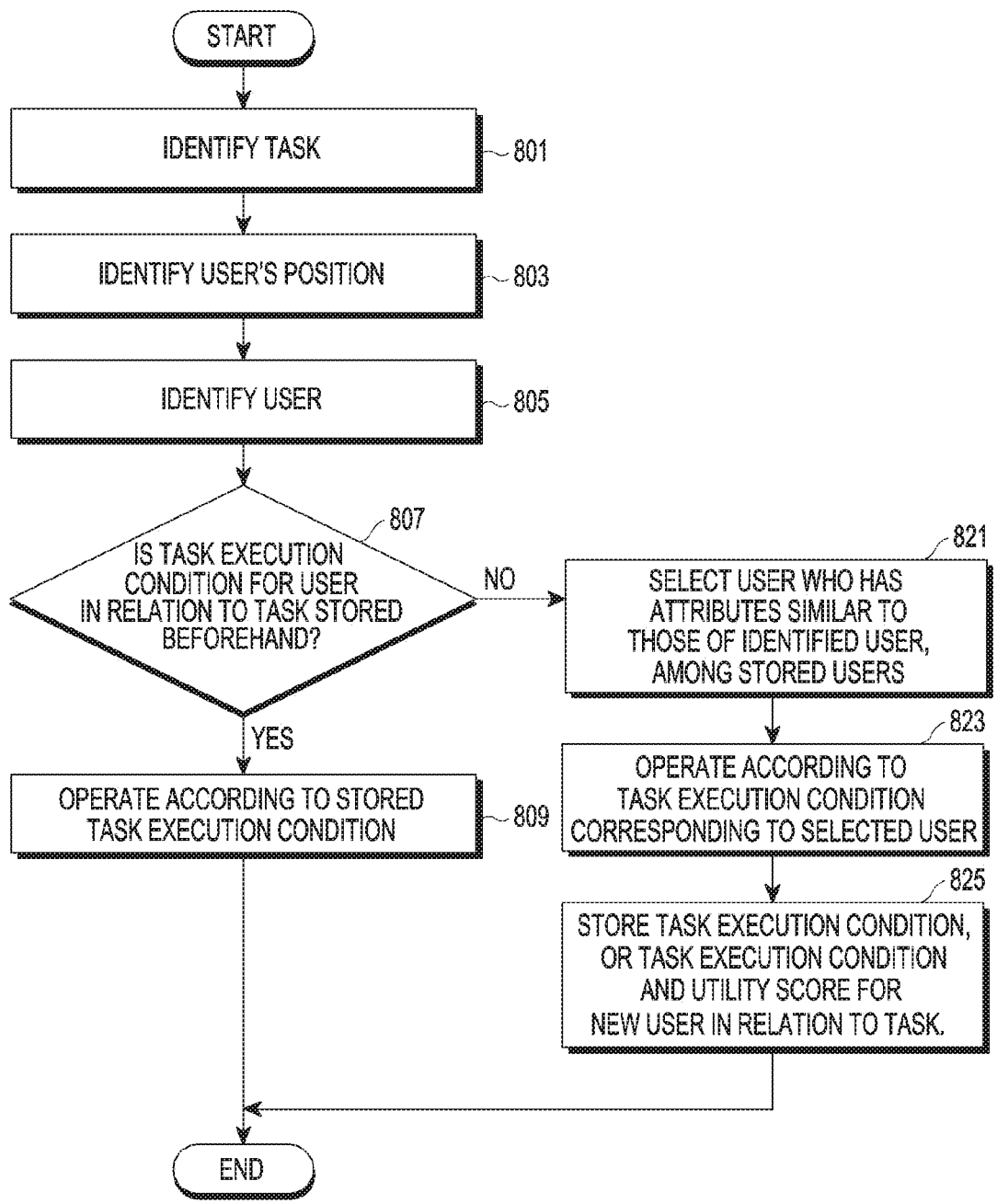
FIG. 8B is a flowchart of an operation of an electronic device, according to an embodiment.

FIG. 8B is a flowchart of an operation of an electronic device, according to an embodiment.

Referring to FIG. 8B, when a task execution condition for a user identified in relation to a task is identified to be not stored beforehand, the electronic device 101 may select at step 821 a user who has attributes similar to those of the identified user, among the stored users. The electronic device 101 may analyze photographed images of the user to identify attributes in the images, such as user's age, gender, etc. The electronic device 101 may select a user having attributes similar to the analyzed attributes among the stored users. The electronic device 101, when failing to identify a user at step 805, may select at step 821 a user having attributes similar to those identified at step 805, among the stored users. At step 823, the electronic device 101 may operate according to a task execution condition corresponding to the selected user. At step 825, the electronic device 101 may store a task execution condition, or a task execution condition and a utility score for a new user in relation to a task. Even for a user who uses the electronic device 101 for the first time, the electronic device 101 may not execute a task according to a designated condition or a random condition, but based on a task execution condition which might be preferred by the new user.

Figure 9A:
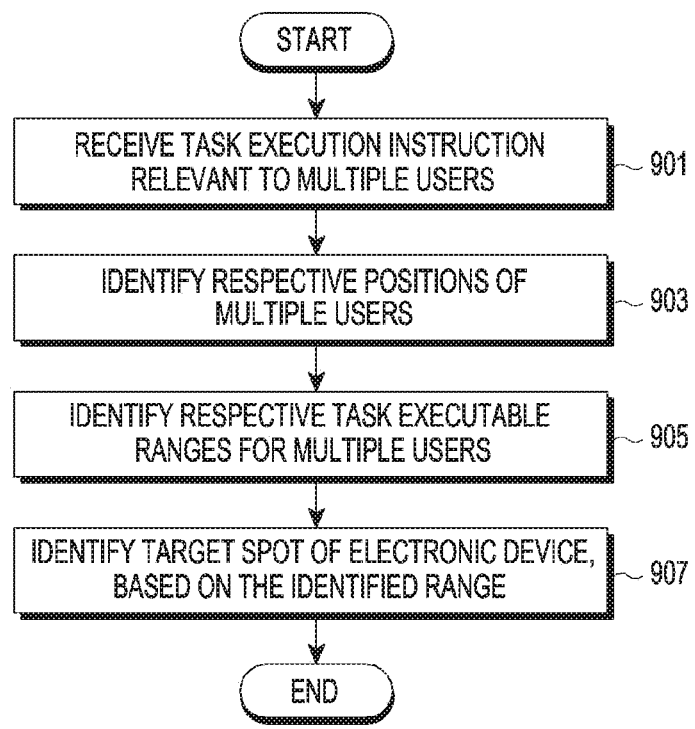
FIGS. 9A and 9B are flowcharts of an operation of an electronic device, according to an embodiment.
Figure 9B:
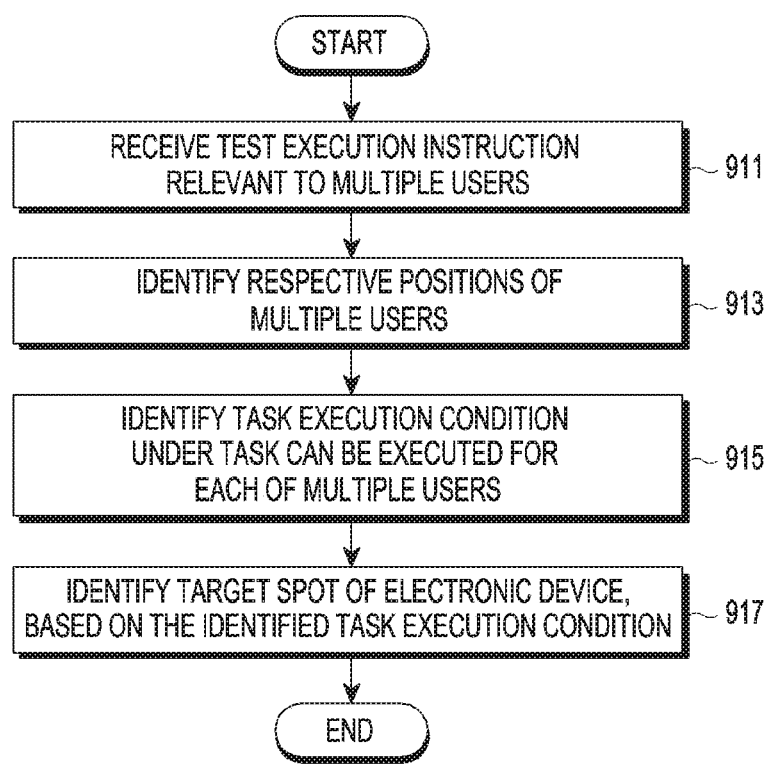
Figure 10A:
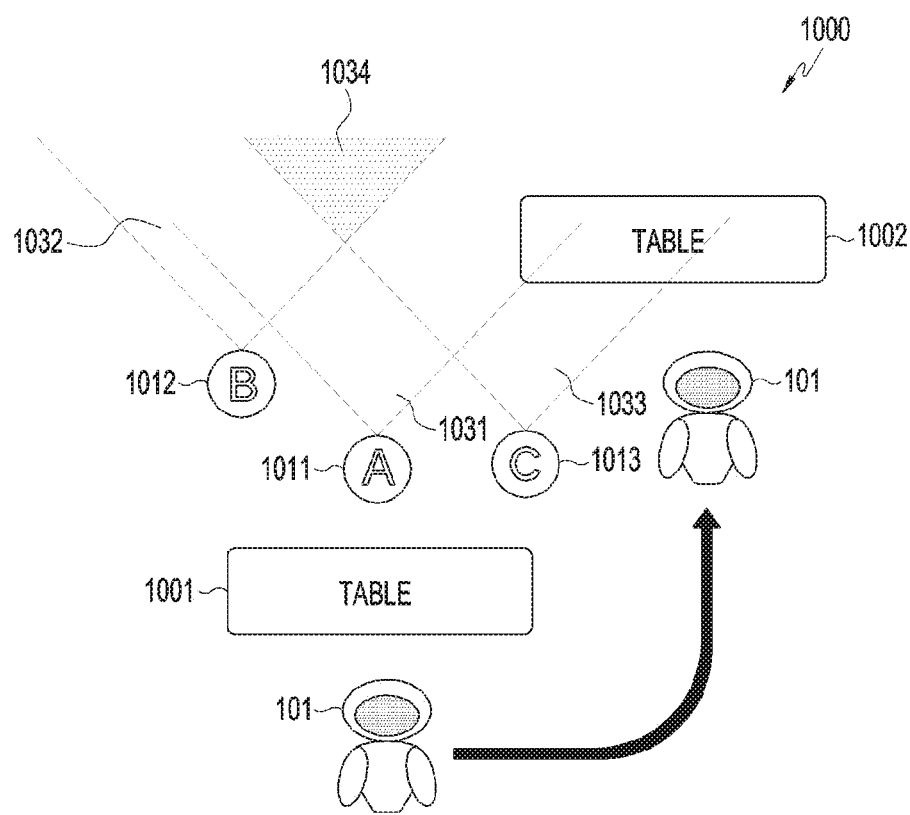
FIGS. 10A and 10B are diagrams of the movement of an electronic device for executing a task for multiple users, according to an embodiment.
Figure 10B:
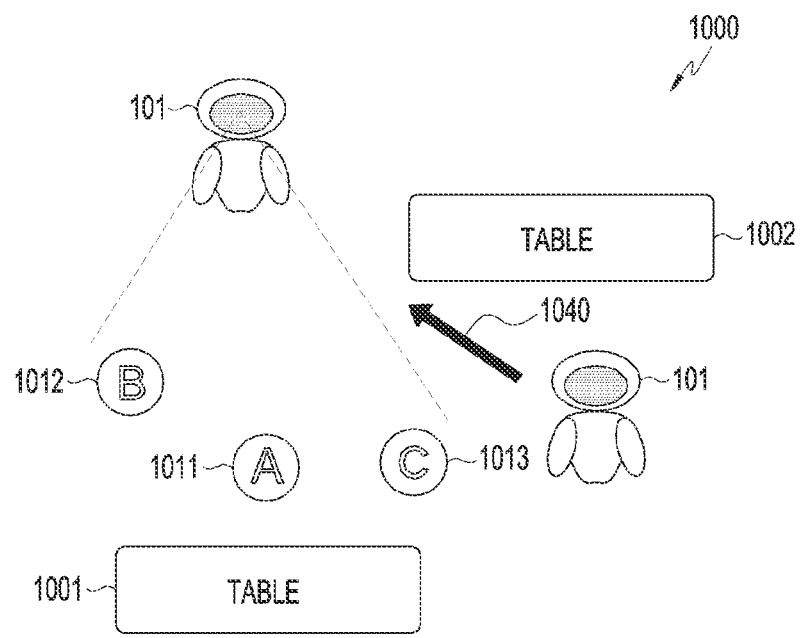
Figure 10C:
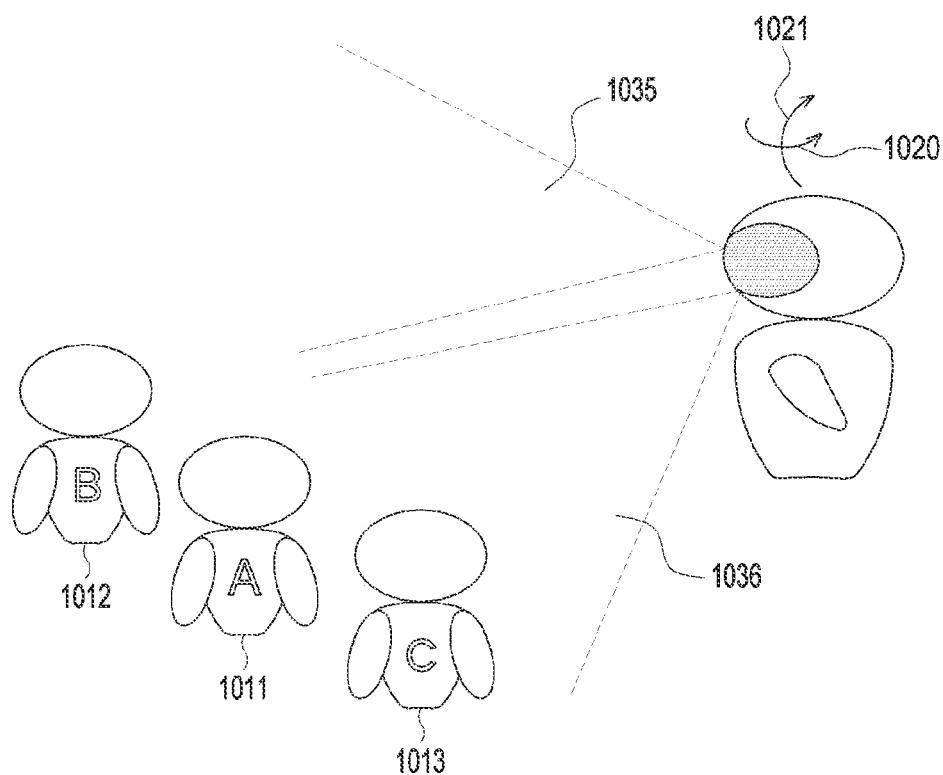
FIG. 10C is a diagram of the rotation or photographing direction change of an electronic device, according to an embodiment.

FIGS. 9A and 9B are flowcharts of an operation of an electronic device, according to an embodiment. FIGS. 10A and 10B are diagrams of the movement of an electronic device for executing a task for multiple users, according to an embodiment. FIG. 10C is a diagram of the rotation or photographing direction change of an electronic device, according to an embodiment.

Referring to FIGS. 9A, 9B, 10A, 10B, and 10C, the electronic device 101 may receive a task execution instruction relevant to multiple users at step 901 in FIG. 9A and step 911 in FIG. 9B. The electronic device 101 may acquire and analyze the speech "take a picture of us". The electronic device 101 may identify based on at least of ASR and NLU that the meaning of the voice is a task execution instruction for photographing an image covering a user who produced the voice and users therearound. The electronic device 101 may acquire a task execution instruction relevant to multiple users via a communication signal or through an input device included therein.

The electronic device 101 may identify at step 903 in FIG. 9A and step 913 in FIG. 9B respective positions of multiple users including a user who produced a voice. The electronic device 101 may set respective positions of multiple users by using directions and distances with reference to the electronic device 101. The electronic device 101 may identify a position of the user who produced speech according to the above-described various methods and may take a scene including the user who produced the speech. The electronic device 101 may analyze the photographed image to identify positions of other users around the user who produced the speech. The electronic device 101 may identify, as photographing targets, users located within a threshold distance or less from the user who produced the speech e and may identify respective positions of the users. The electronic device 101 may immediately identify, as photographing targets, multiple users located in the direction from which the speech was identified to be produced and may identify respective positions of the multiple users. The electronic device 101 may be arranged at a position that cannot allow immediately photographing a user who produced the speech. The electronic device 101 may first move toward the spot from which the speech was produced and may photograph the user who produced a voice and other neighboring users during movement. When receiving a communication signal, the electronic device 101 may identify the direction in which the communication signal was received, based on various techniques (e.g., TDOA or FDOA). The electronic device 101 may perform a photographing task while moving toward a spot from which a communication signal was sent and may photograph a user who produced the speech and other users therearound.

The electronic device 101 may identify respective task executable ranges for multiple users at step 905 in FIG. 9A, and may identify a task execution condition under which a task can be executed for each of multiple users at step 915 in FIG. 9B. The electronic device 101 acquires at steps 901 and 911 a task execution instruction to photographing multiple users, and as shown in FIG. 10A, respective positions of multiple users are 1011, 1012, and 1013. The electronic device 101 may identify respective directions of multiple users 1011, 1012, and 1013 are facing. The electronic device 101 may first move to a spot at which the electronic device 101 can photograph at least part of the faces of multiple users 1011, 1012, and 1013, as shown in FIG. 10A. The electronic device 101 may avoid tables 1001 and 1002 arranged in the indoor environment 1000 and move to a spot at which the electronic device 101 is allowed to photograph parts of the faces. The electronic device 101 may move after identifying a spot at which part of the faces are allowed to be photographed or may move while photographing and perform at least one movement and rotation until parts of the faces are photographed. The electronic device 101 may analyze an image having at least part of the faces to identify respective directions in which multiple users 1011, 1012, and 1013 are facing. The electronic device 101 may identify a task executable range for each of multiple users 1011, 1012, and 1013, based on at least one of respective positions or facing directions of multiple users 1011, 1012, and 1013. It may be requested for a task of image photographing that users be positioned to have a designated angle with respect to the electronic device 101. The electronic device 101 may identify task executable ranges 1031, 1032, and 1033 based on positions and directions of the users.

The electronic device 101 may identify a target spot thereof at step 907 in FIG. 9A and step 917 in FIG. 9B, based on the identified ranges in FIG. 9A and on the identified task execution condition in FIG. 9B. The electronic device 101 may identify as a target spot a region 1034 which is common to the task executable ranges 1031, 1032, and 1033 corresponding respectively to multiple users 1011, 1012, and 1013. The electronic device 101 may move (1040) to an identified target spot and may photograph multiple users 1011, 1012, and 1013 at the target spot. The electronic device 101 may perform rotation so as to photograph faces of multiple users 1011, 1012, and 1013. After having moved (1040) to the identified spot, the electronic device 101 may execute continuous shooting for multiple users 1011, 1012, and 1013. While rotating or changing photographing angles, the electronic device 101 may identify that objects corresponding to multiple users 1011, 1012, and 1013 in the photographed images meet designated conditions. The electronic device 101, as shown in FIG. 10C, may perform photographing 1035 after movement. The electronic device 101 may identify that an object (e.g., a user face) on the acquired image resulting from the photographing 1035 do not meet a designated condition. As a result of photographing 1035 a part of the faces of the multiple users 1011, 1012, and 1013 may be omitted or the faces of some users may be not included. The electronic device 101 may rotate the first housing 102 in the left/right direction (1020) or in the up/down direction (1021) and may execute continuous shooting (1036) for images during rotation. The electronic device 101 may identify that an object on an image acquired as a result of photographing meets a designated condition and may store, as a photo image, the image in which an object meets a designated condition. The electronic device 101 may provide a countdown to afford a time for which the user can take a pose. After completion of countdown, the electronic device 101 may take an image and may store the acquired image as a photo image. The electronic device 101 may display the photo image through a display or send the photo image to designated electronic devices corresponding to multiple users 1011, 1012, and 1013. An electronic device 101 may learn correlation between photographing positions or directions and photo images of plural subjects and may store photographing positions or directions for plural subjects, as a learning result. The electronic device 101 may identify at least one of photographing positions and photographing direction for multiple users. The electronic device 101 may calculate illumination information therearound, may identify a distance to the subject for photography, and may identify at least one of a photographing position or a photographing direction based on the corresponding information. The electronic device 101 may provide countdown and may execute photographing after countdown. While providing countdown, the electronic device 101 may receive from at least one of the multiple users speech requesting to change the at least one of the photographing position or the photographing direction. One user may produce the speech "I hate that my face appears big" during countdown. The electronic device 101 may identify a user who produced the speech and may move again to a spot which is spaced away by a longer distance from the corresponding user than the other users. The electronic device 101 may move or rotate at least part of the housings until the area of an object corresponding to the face of the user of interest is detected to be smaller than that of an object to another user within an image. The electronic device 101 may perform both of rotation and movement. When detecting the area of an object corresponding to the face of the user of interest is smaller than that of an object to another user within an image, the electronic device 101 may store the image of interest non-transitorily or may provide countdown again and then may non-transitorily store an image taken after the countdown.

Figure 11:
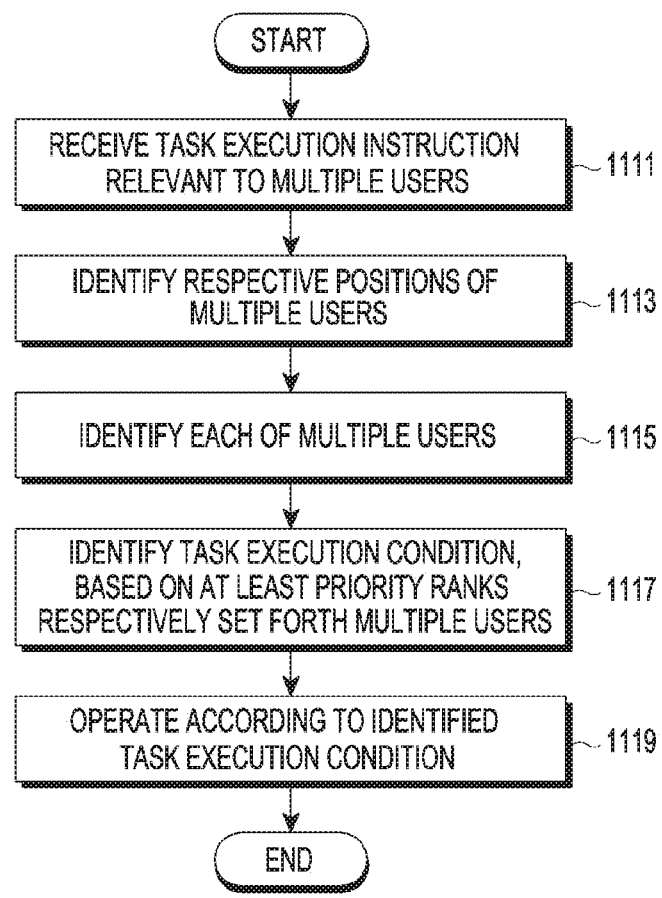
FIG. 11 is a flowchart of an operation of an electronic device, according to an embodiment.
Figure 12:
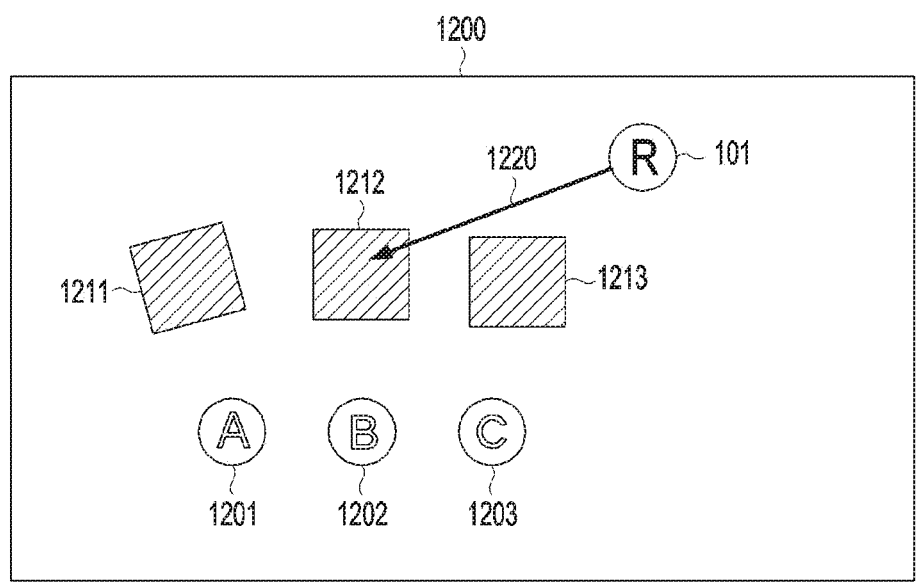
FIG. 12 is a diagram of the movement of an electronic device, according to an embodiment.

FIG. 11 is a flowchart of an operation of an electronic device, according to an embodiment. FIG. 12 is a diagram of the movement of an electronic device, according to an embodiment.

Referring to FIGS. 11 and 12, the electronic device 101 may receive a task execution instruction relevant to multiple users at step 1111. The electronic device 101 may receive a task execution instruction relevant to multiple users based on a voice analysis result, a communication signal, direct inputting, etc. At step 1113, electronic device 101 may identify respective positions of multiple users. The electronic device 101 may photograph a scene covering multiple users and may analyze the photographed image to identify respective positions of the multiple users. The electronic device 101 may identify respective directions in which multiple users are facing. The electronic device 101 may identify respective directions in which multiple users are facing based on at least shapes of the faces or bodies of users within the image. At step 1115, the electronic device 101 may identify multiple users individually. The electronic device 101 may perform face recognition within images to individually identify objects included in the images.

The electronic device 101 may identify a task execution condition at step 1117, based on priority ranks set forth for multiple users. At step 1119, the electronic device 101 may operate according to the identified task execution condition. The electronic device 101 may store a task execution condition for a particular task by user. Each of task execution conditions may have a score or rank. As shown in FIG. 12, the electronic device 101 may be position in an indoor environment 1200. In the indoor environment 1200, multiple users 1201, 1202, and 1203 may exist. The electronic device 101 may identify respective positions of the multiple users 1201, 1202, and 1203. The electronic device 101 may identify respective directions in which the multiple users 1201, 1202, and 1203 are facing. The electronic device 101 may identify respective optimal execution conditions set forth for the multiple users 1201, 1202, and 1203. The electronic device 101 may identify each of optimal task execution ranges 1211, 1212, and 1213 corresponding respectively to the multiple users 1201, 1202, and 1203, based on at least one of the position or direction of each of the multiple users 1201, 1202, and 1203. The electronic device 101 may identify a task execution condition, based on at least of the priority ranks of the multiple users 1201, 1202, and 1203. The electronic device 101 may identify that a second user 1202 has higher priority than the other users 1201 and 1203. Priority may be designated beforehand. The electronic device 101 may allocate priority for a user who produced speech. The electronic device 101 may identify a task execution range 1212 corresponding to the second user 1202 as an optimal task execution position and may move (1220) the identified optimal task execution position. The electronic device 101 may perform a task in a time-divisional manner for users having the same priority. When there is a request for executing a task that a story be output with eye contacts with two users for which the same priority is set forth, the electronic device 101 may perform a task for a period of a first time for the first user and for a period of a second time for the second user. The electronic device 101 may perform a task for multiple users in an alternating manner.

Figure 13:
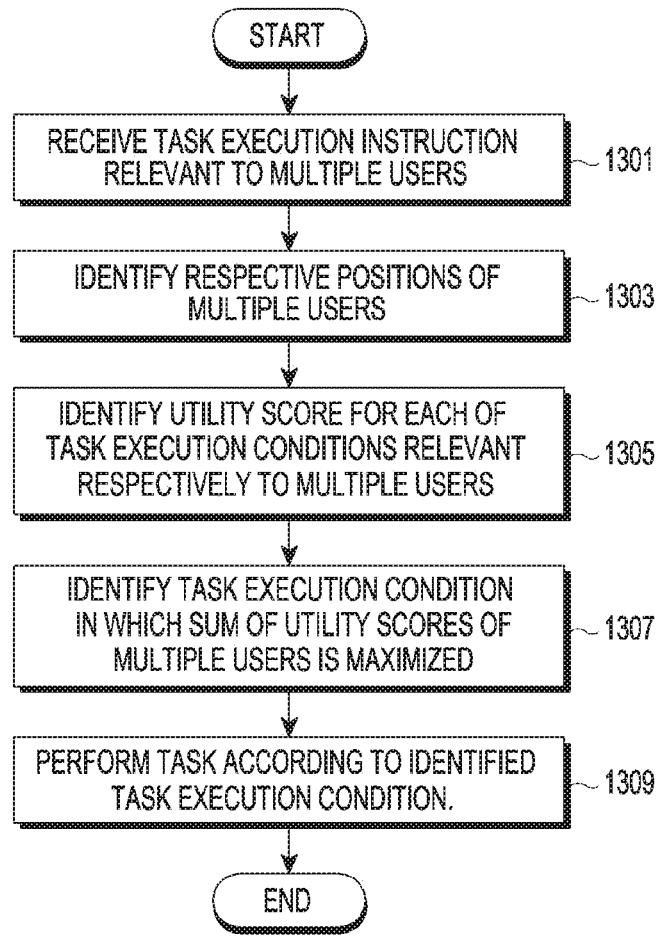
FIG. 13 is a flowchart of an operation of an electronic device, according to an embodiment.

FIG. 13 is a flowchart of an operation of an electronic device, according to an embodiment.

Referring to FIG. 13, the electronic device 101 may receive a task execution instruction relevant to multiple users at step 1301. At step 1303, the electronic device 101 may identify respective positions of multiple users. The electronic device 101 may identify multiple users individually. At step 1305, the electronic device 101 may identify a utility score for each of task execution conditions relevant respectively to multiple users. At step 1307, the electronic device 101 may identify a task execution condition in which a sum of utility scores of multiple users is maximized. At step 1309, the electronic device 101 may perform a task according to an identified task execution condition. With regard to a photographing task for a first user the electronic device 101 may identify a utility score of 100 for left shooting, 50 for front shooting, and 50 for right shooting. With regard to a photographing task for a second user, the electronic device 101 may identify a utility score of 70 for left shooting, 20 for front shooting, and 100 for right shooting. When photographing the first and the second user from the left, the electronic device 101 may identify a maximum utility score of 170. Accordingly, the electronic device 101 may photograph the multiple users from the left. The electronic device 101 may apply weights by user in the procedure of calculating a sum of utility scores and thus may calculate a weighed sum of utility scores. When a second user is identified to produce speech, the electronic device 101 may allocate a weight of "1" for the second user and a weight of "0.5" for the remaining first user. The electronic device 101 may identify the weighed sum of the utility scores 100*0.5+70=120 upon photographing from the left and 50*0.5+100=125 upon photographing from the right. Hence, the electronic device 101 may photograph multiple users from the right in which a maximum weighed sum of utility scores may be obtained. The electronic device 101 may allocate weights based on various information relevant to at least a user. The electronic device 101 may allocate a high weight for a second user in response to the detection of the fact that the second user was more frequently photographed and uploaded more images to the SNS than a first user. The electronic device 101 may allocate weights by user based on at least preset priority. The priority may be changed according to groups including users. When the two users Tom and Teddy are identified, the electronic device 101 may allocates weights of 1 and 0.8 respectively for Tom and Teddy. When Tom, Teddy, and Jane are identified, the electronic device 101 may allocate weights of 0.3 and 0.4 respectively for Tom and Teddy and a weight of 1 for Jane. The electronic device 101 may determine weights, depending on the presence or absence of the ownership thereof. When the information that Tom is the owner of the electronic device 101 is identified, the electronic device 101 may allocate a higher weight for Tom than Teddy and Jane, who are not the owner. The electronic device 101 may identify a task execution condition for multiple users by means of various calculation methods, such as a weighed sum, a simple sum, a complex function, etc.

Figure 14A:
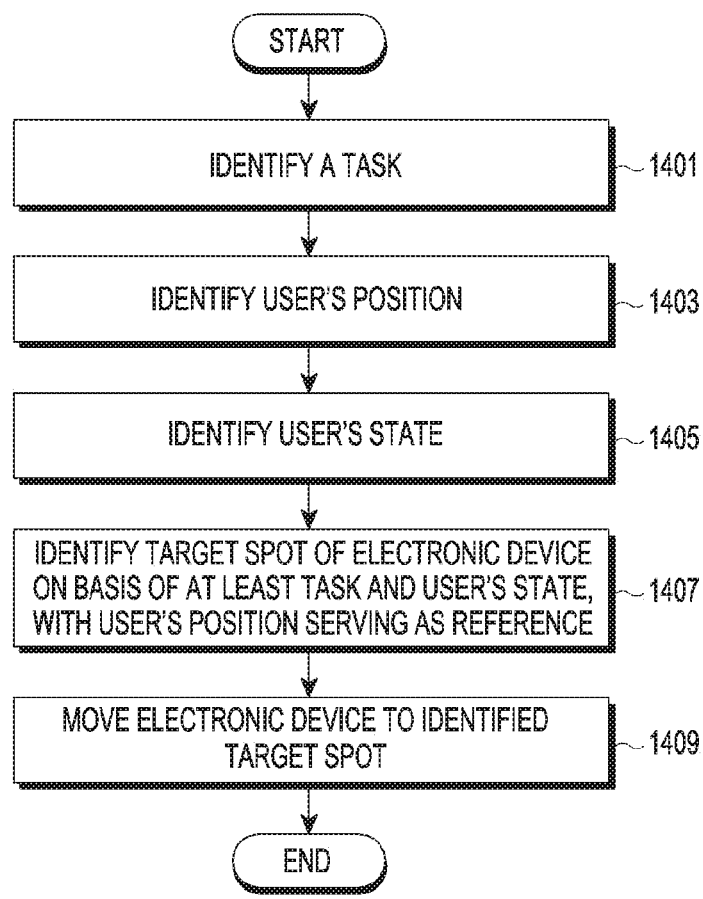
FIG. 14A is a flowchart of an operation of an electronic device, according to an embodiment.

FIG. 14A is a flowchart of an operation of an electronic device, according to an embodiment.

Referring to FIG. 14A, the electronic device 101 may identify, at step 1401, a task to be executed. At step 1403, the electronic device 101 may identify a position of a user associated with a task. At step 1405, the electronic device 101 may identify a state of a user associated with a task. The state of a user may include various factors, such as user's gaze, kinds and directions of interaction between a user and an object or a different user, a user's interaction range, etc. At step 1407, the electronic device 101 may identify a target spot thereof based on at least a task and a user's state, with the position of the user serving as a reference. At step 1409, the electronic device 101 may control by self to move to an identified target spot. When receiving an instruction of executing a first task from a user the electronic device 101 may identify different target spots depending on user's states. This will be described in more detail, below.

Figure 14B:
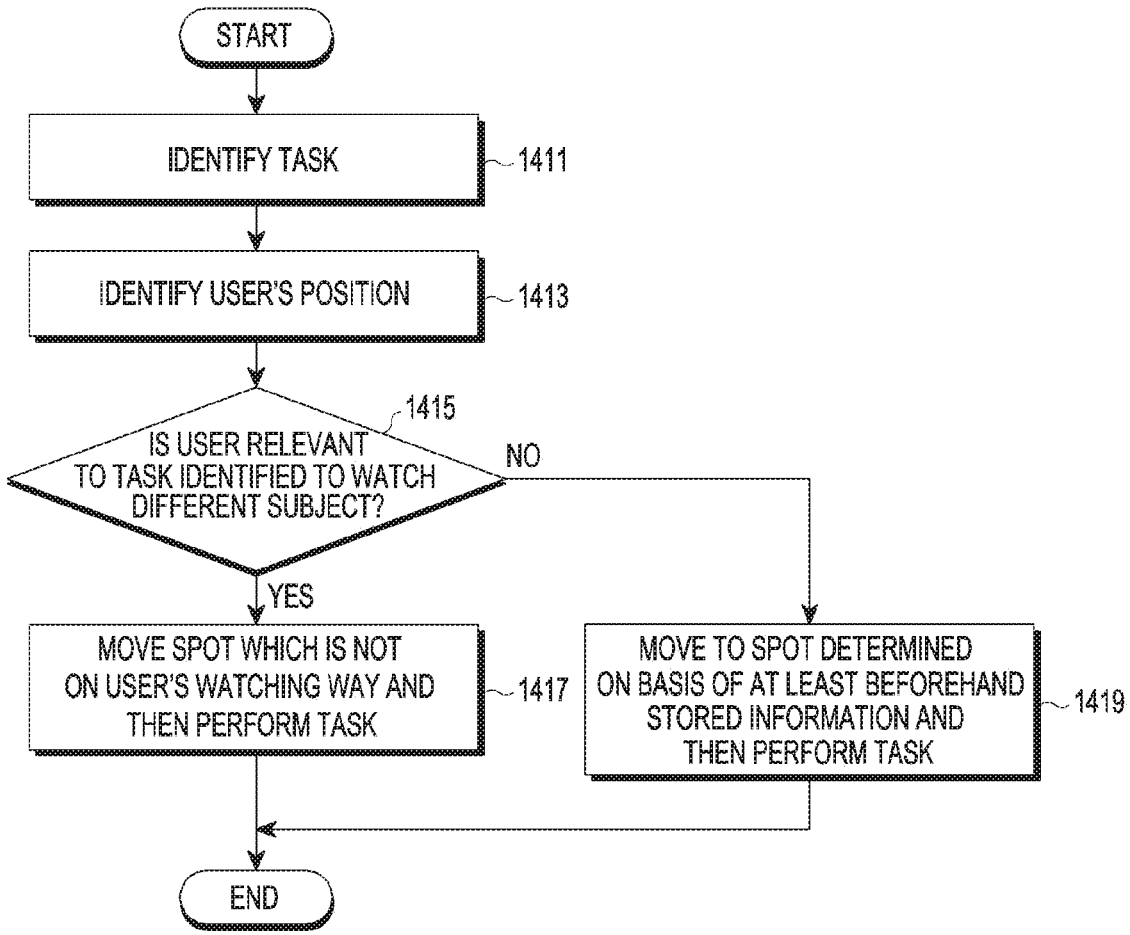
FIG. 14B is a flowchart of an operation of an electronic device, according to an embodiment.
Figure 15A:
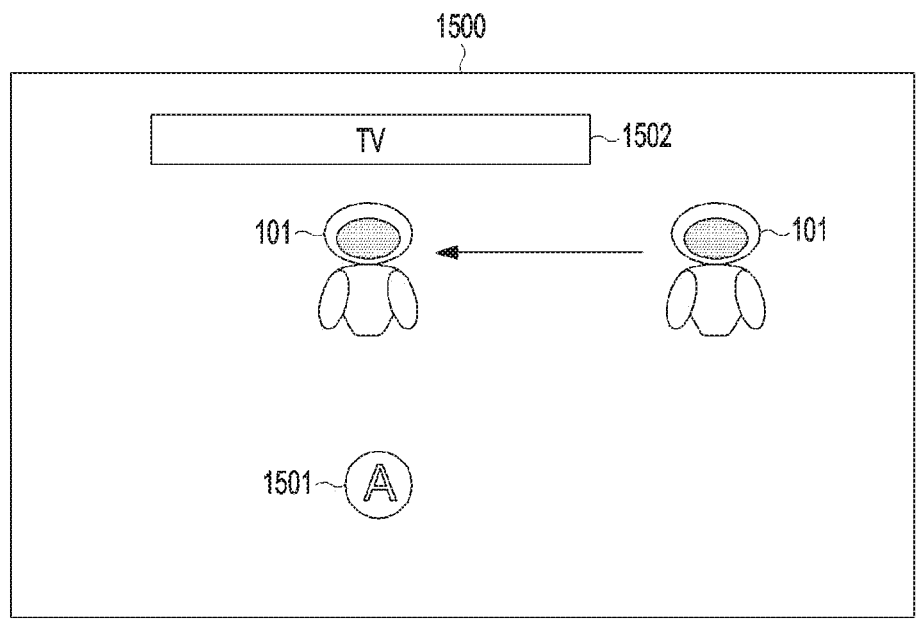
FIGS. 15A and 15B are diagrams of a movement procedure of an electronic device depending on a user's state, according to an embodiment.
Figure 15B:
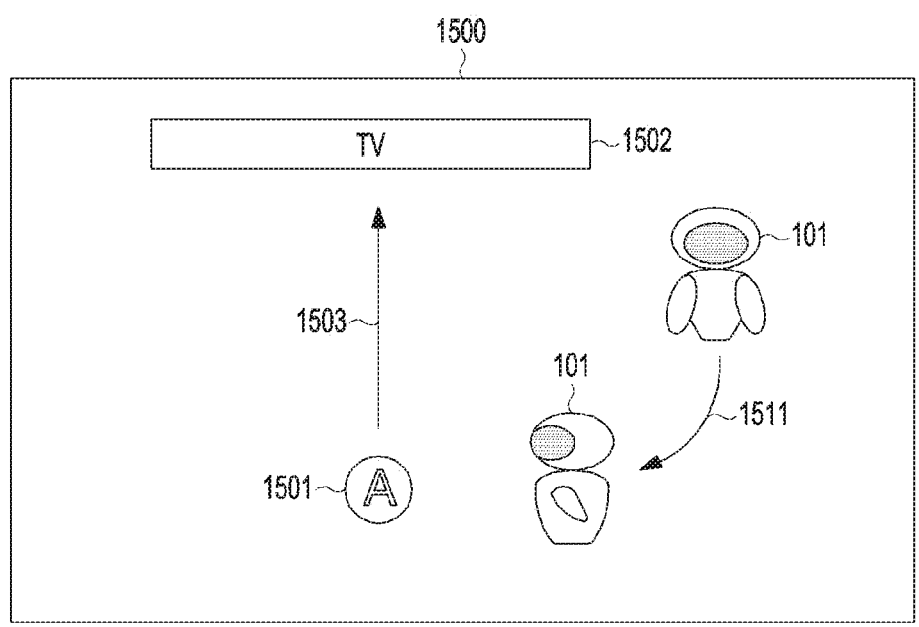

FIG. 14B is a flowchart of an operation of an electronic device, according to an embodiment. FIGS. 15A and 15B are diagrams of a movement procedure of an electronic device depending on a user's state, according to an embodiment.

Referring to FIGS. 14B, 15A, and 15B, the electronic device 101 may identify at step 1411 a task to be executed. At step 1413, the electronic device 101 may identify a position of a user. The electronic device 101 may identify a position of a user 1501, as shown in FIG. 15A. At step 1415, the electronic device 101 may identify whether a user relevant to a task watches a different subject. The electronic device 101 may analyze photographed images of a user to identify user's gaze. The electronic device 101 may determine that a user watches a different subject when a time during which the motion of the user's gaze does is modulated at a threshold frequency or less within a reference period of time is identified to be greater than a threshold time or longer. The electronic device 101 may identify a user's watching by using a communication signal from a different electronic device (e.g., TV 1502 arranged in an indoor environment 1500, as shown in FIG. 15A). The electronic device 101 may receive a communication signal (e.g., near-field communication signal) from a TV set 1502 and thus may identify that the TV set 1502 is turned ON. When the user is identified to not move the gaze at a threshold frequency or higher for a threshold period of time or longer with the TV 1502 turned ON, the electronic device 101 may identify that a user is watching TV 1502. The electronic device 101 may identify a user's watching TV 1502 through the scene analysis of the images acquired by photographing the user 1501 and the TV set 1502. The electronic device 101 may identify the On-state of TV 1502 by analyzing sounds output from the TV 1502.

When a user is identified to be watching a different subject, the electronic device 101 may move a spot which is not on the watching way and then may perform a task at step 1417. When a user is identified to not be watching a different subject, the electronic device 101 may move to a spot determined based on at least beforehand stored information and then perform a task at step 1419. As shown in FIG. 15A, when a user 1501 is identified to be not watching TV 1502, the electronic device 101 may move to a position between the user 1501 and the TV 1502 so as to perform a particular task (e.g., displaying). The electronic device 101 may analyze the voice "What is this?" to identify a spot at which a task is performed and then may move to the spot. As shown in FIG. 15B, when a user 1501 was identified to be watching (1503) TV 1502, the electronic device 101 may exclude a region between the user 1501 and the TV set 1502 from the task executable region thereof. The electronic device 101 may move (1511) a spot other than the region between the user 1501 and the TV 1502, which is excluded from a task executable range, in order to perform a particular task. In response to the speech "What is this?", the electronic device 101 may identify as a target point a spot at which a user can best watch a displayed content among the spots where it is possible to provide a content. The electronic device 101 may identify a target spot in consideration of a distance allowing a user to watch a content, or a viewing angle or may use brightness information of a surrounding environment to identify a target spot. At a highly bright spot, a user has difficulty in watching a displayed content. The electronic device 101 may take an image of the surrounding environment to produce a threshold image for intensity and may use the image to identify brightness information on the surrounding environment. A threshold image may be an image produced by categorizing pixels having intensity exceeding a threshold vale into a first region and pixels having intensity as low as or lower than a threshold value into a second region. The electronic device 101 may also identify a spot having intensity as low as or lower than a threshold value as a task executable range of a content display. The electronic device 101 may identify a second region of a threshold image as a task executable range. A threshold value for generating a threshold image may be set forth as an intensity value for executing a particular task and may be set forth to differ one task to another. The electronic device 101 may identify a target spot in consideration of a noise generated from TV 1502. As described above, the electronic device 101 may move to different spots depending on the present state of a user even though receiving task execution instruction of the same kind from the same user. The electronic device 101 may receive the voice "Ah~" as feedback information from the user and may identify the voice as positive information to upgrade the utility score for the corresponding task execution condition. The electronic device 101 may identify that a user gathers his or her brows and may move to a spot more proximal to the user in response to the action. The electronic device 101 may move to a spot more distal to the user or further left or right from the present position. The electronic device 101 may downgrade the utility score for the corresponding task execution condition. The electronic device 101 may identify that a user is not watching the display of the electronic device 101 and rather, that the user changes the direction of the body to keep watching TV 1502. The electronic device 101 may identify this action as negative feedback and thus may downgrade a utility score for the corresponding task execution condition.

The electronic device 101 may identify a task execution condition, based on at least one of kinds, ranges and directions of user's interaction or activity. The electronic device 101 may analyze at least one photographed image of the user to identify the information that the user is performing interaction or activity, such as that the user is dialoguing with another user or that the user is doing exercise. The electronic device 101 may identify kinds, ranges, or directions of user's interaction or activity and may exclude a range interfering with user's interaction or activity from a task executable range. The electronic device 101 may not interfere with the user's activity or interaction by selecting a target spot within a task executable region.

Figure 16A:
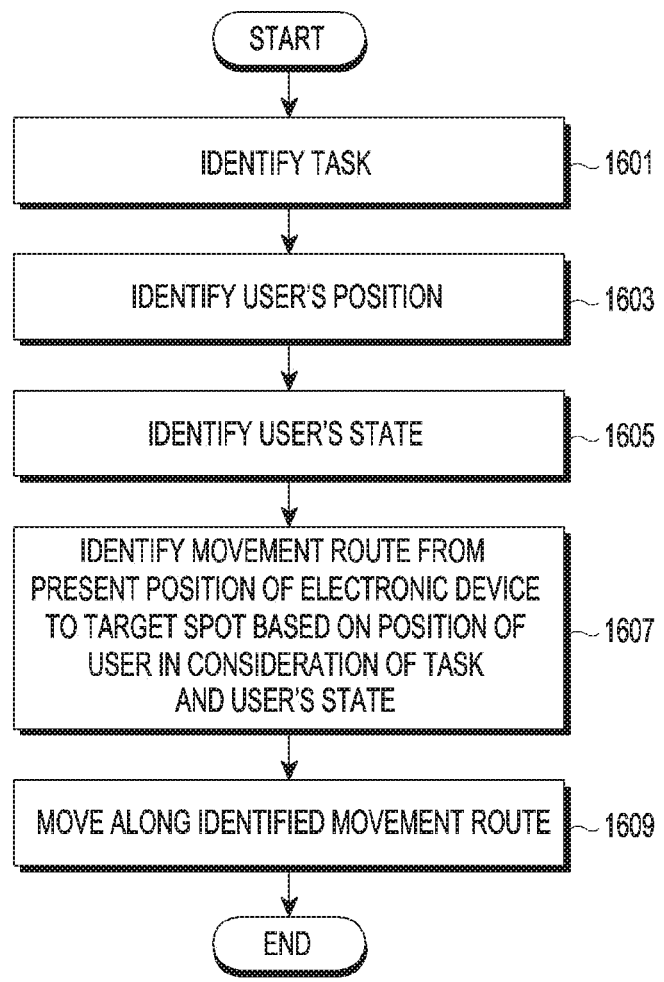
FIG. 16A is a flowchart of an operation of an electronic device, according to an embodiment.
Figure 16B:
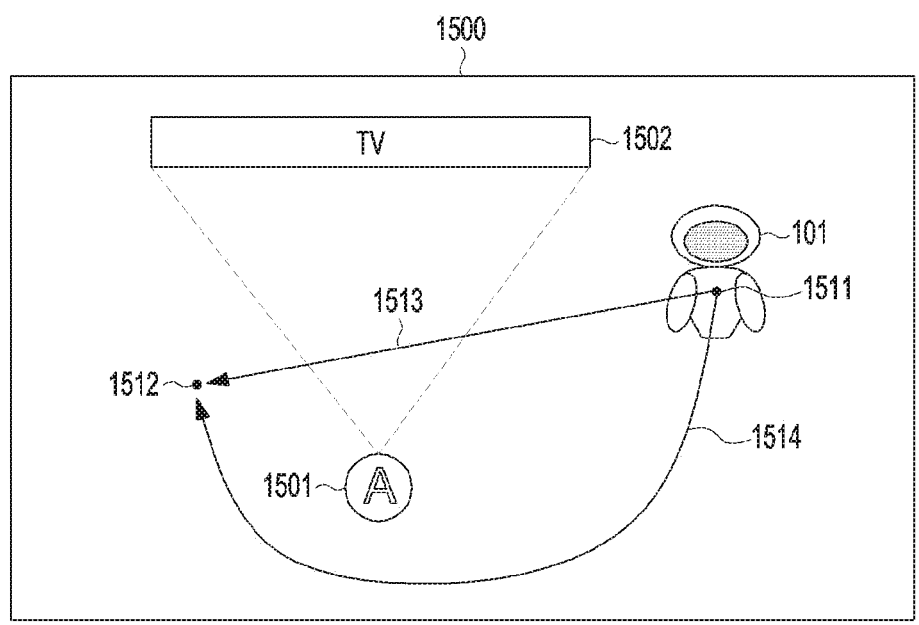
FIG. 16B is a diagram of the movement route of an electronic device, according to an embodiment.

FIG. 16A is a flowchart of an operation of an electronic device, according to an embodiment. FIG. 16B is a diagram of the movement route of an electronic device, according to an embodiment.

Referring to FIGS. 16A and 16B, the electronic device 101 may identify at step 1601 a task to be performed. At step 1603, the electronic device 101 may identify a position of a user. At step 1605, the electronic device 101 may identify a user's state associated with the task. At step 1607, the electronic device 101 may identify a movement route from the present position of the electronic device to a target spot based on the position of the user in consideration of the task and the user's state. The electronic device 101 may identify a target spot based on at least one of a task executable range, a user identification information, and a user's state. As shown in FIG. 16B, the electronic device 101 may be requested to perform the task of "photographing" and may identify a target spot 1512 according to an optimal task execution condition corresponding to a user 1501. The electronic device 101 may identify a movement route from a present spot 1511 to the target spot 1512. The electronic device 101 may identify the shortest, straight route 1513 from the present spot 1511 to the target spot 1512. The electronic device 101 may identify a movement route, based on the task and a user's state. When the user 1501 is identified to be watching TV 1502 as shown in FIG. 16B, the electronic device 101 may identify a region between the user 1501 and the TV 1502 as an inaccessible region and may exclude the region from a movement route. The electronic device 101 may determine a detour route 1514 other than the prohibit region. The electronic device 101 may determine a shortest route as the detour route 1514, except for the inaccessible region. At step 1609, the electronic device 101 may move along the identified movement route.

Figure 17:
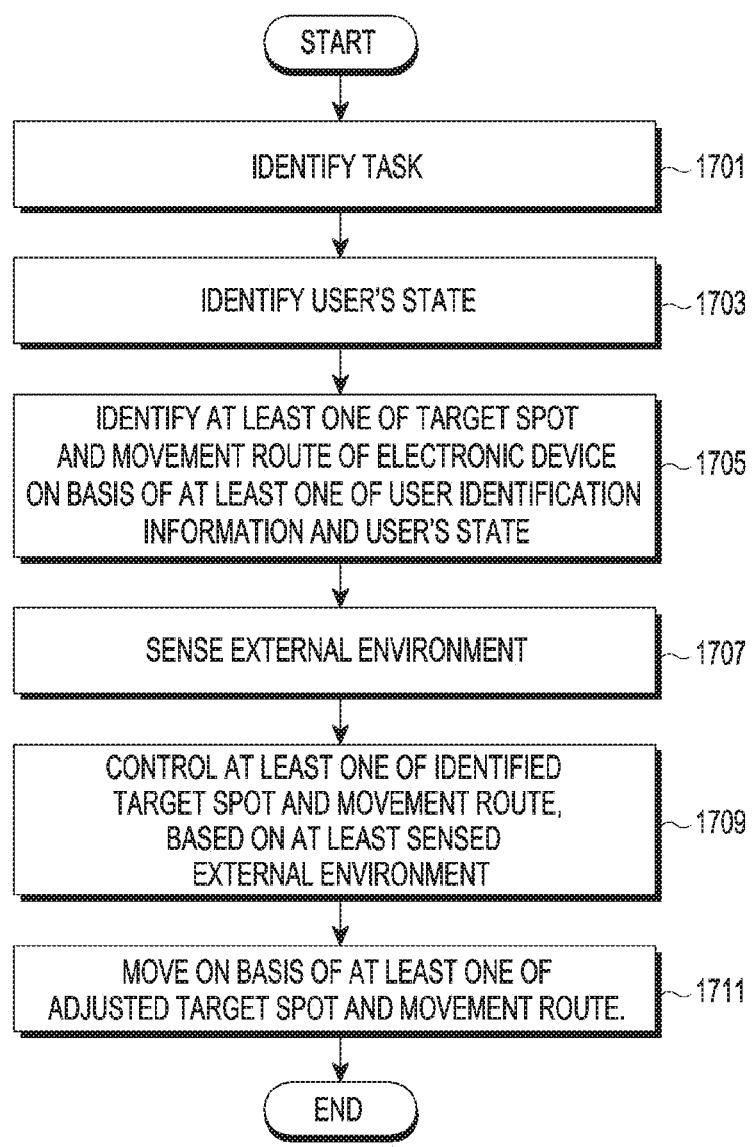
FIG. 17 is a flowchart of an operation of an electronic device, according to an embodiment.

FIG. 17 is a flowchart of an operation of an electronic device, according to an embodiment.

Referring to FIG. 17, the electronic device 101 may identify a task corresponding to a voice at step 1701. At step 1703, the electronic device 101 may identify a position of a user. At step 1705, the electronic device 101 may identify at least one of a target spot and a movement route of the electronic device based on at least one of user identification information and a user's state. As described above, the electronic device 101 may identify an optimal spot, based on user identification information. The electronic device 101 may also identify an optimal movement route, based on user identification information. The electronic device 101 may store a movement route for execution of at least one task and corresponding feedback and may analyze stored information to identify optimal movement routes by user. The electronic device 101 may classify and manage users by using identifiers and may identify an optimal movement route by using identifier. The electronic device 101 may identify at least one of a target spot and a movement route, based on at least a user's state. At step 1707, the electronic device 101 may sense an external environment. At step 1709, the electronic device 101 may control at least one of the identified target spot and the movement route, based on at least the sensed external environment. The electronic device 101 may sense an object positioned on the identified target spot or on the movement route. The electronic device 101 may identify at least one of a target spot and a movement route which makes a detour around the object. At step 1711, the electronic device 101 may move based on at least one of adjusted target spots and movement routes. The electronic device 101 may move toward the identified target spot along the identified movement route at step 1705 and may sense an external environment during movement. The electronic device 101 may change the movement route in real time during movement, depending on the analysis result of the sensed external environment. With the real-time change of movement routes, the electronic device 101 may avoid moving barriers as well as stationary barriers. The electronic device 101 may identify feedback information according to movement routes and may identify and manage utility scores for at least one movement route by user identification information or by user's states with regard to a task based on at least feedback information. The electronic device 101 may identify in real time a movement route on which a utility score can peak during movement. The electronic device 101 may identify a movement route which a maximum or local maximum utility score can be obtained.

Figure 18:
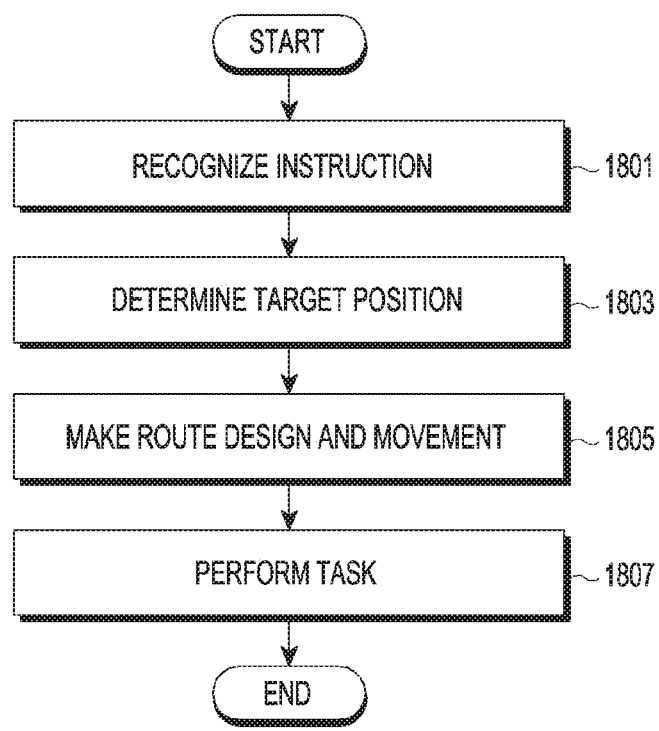
FIG. 18 is a flowchart of an operation of an electronic device, according to an embodiment.

FIG. 18 is a flowchart of an operation of an electronic device, according to an embodiment.

Referring to FIG. 18, the electronic device 101 may recognize an instruction at step 1801. The electronic device 101 may recognize an instruction in various manners such as by analyzing speech, communication signals, images, or information directly input by a user through a touch screen or buttons installed therein. Accordingly, the electronic device 101 may identify a task to be performed. At step 1803, the electronic device 101 may determine a target position. The electronic device 101 may determine a target spot thereof, based on at least one of kinds of tasks, user identification information, and user's states. The electronic device 101 may determine a target spot additionally in consideration of external sensing information and a task executable range. At step 1805, the electronic device 101 may make a route design and movement. The electronic device 101 may identify a movement route thereof, based on at least one of kinds of tasks, user identification information, and user's states. The electronic device 101 may adjust a movement route, based on at least external sensing information and may move along the adjusted route. At step 1807, the electronic device 101 may perform a task.

Figure 19A:
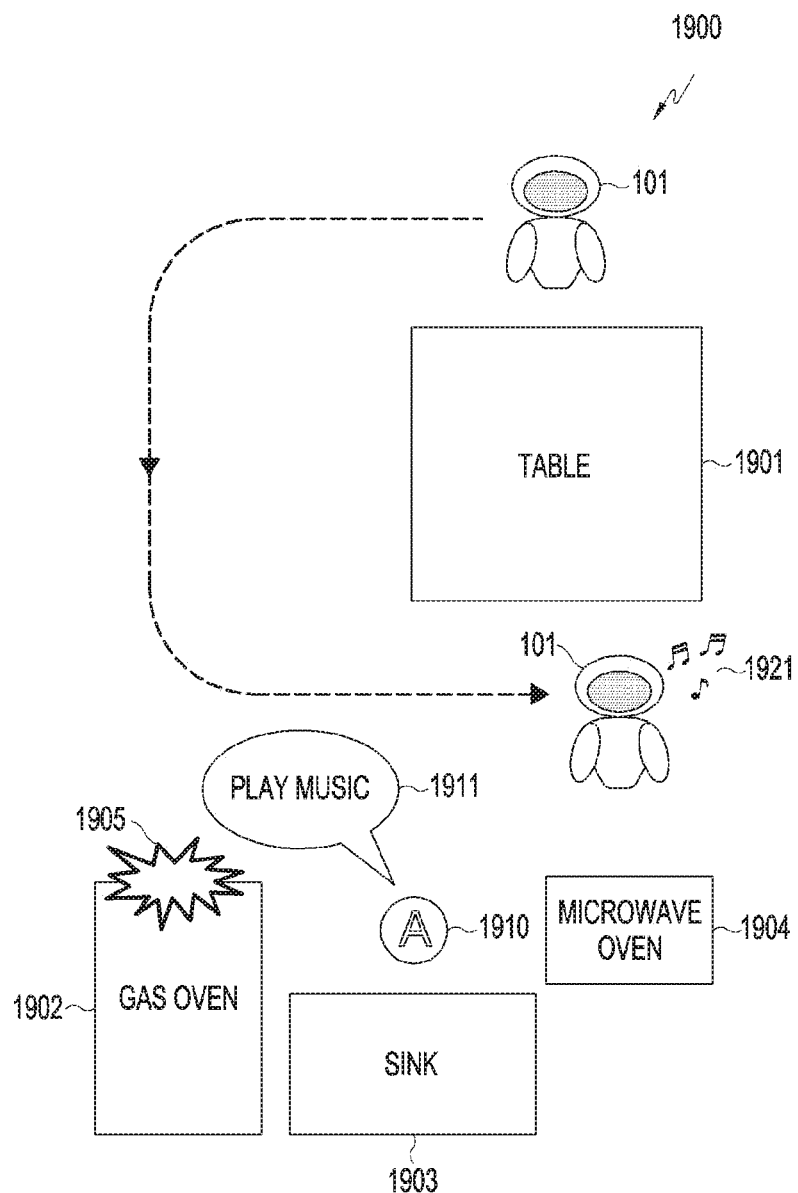
FIGS. 19A, 19B, and 19C are diagrams of the movement of an electronic device, according to an embodiment.
Figure 19B:
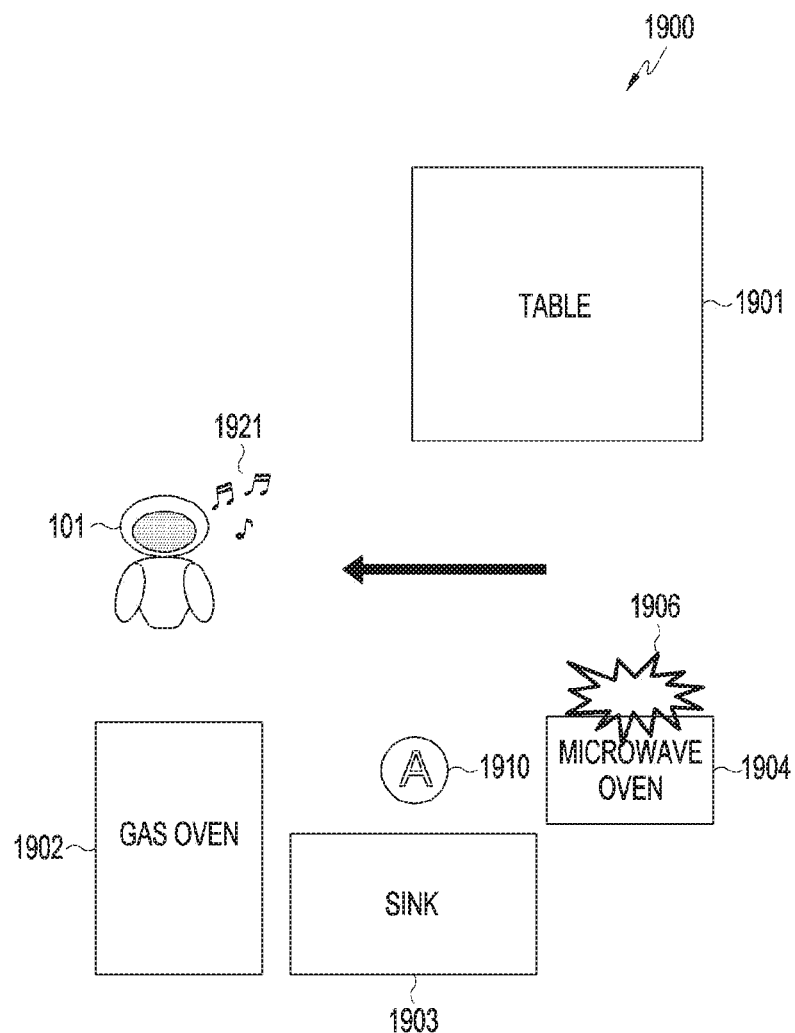
Figure 19C:
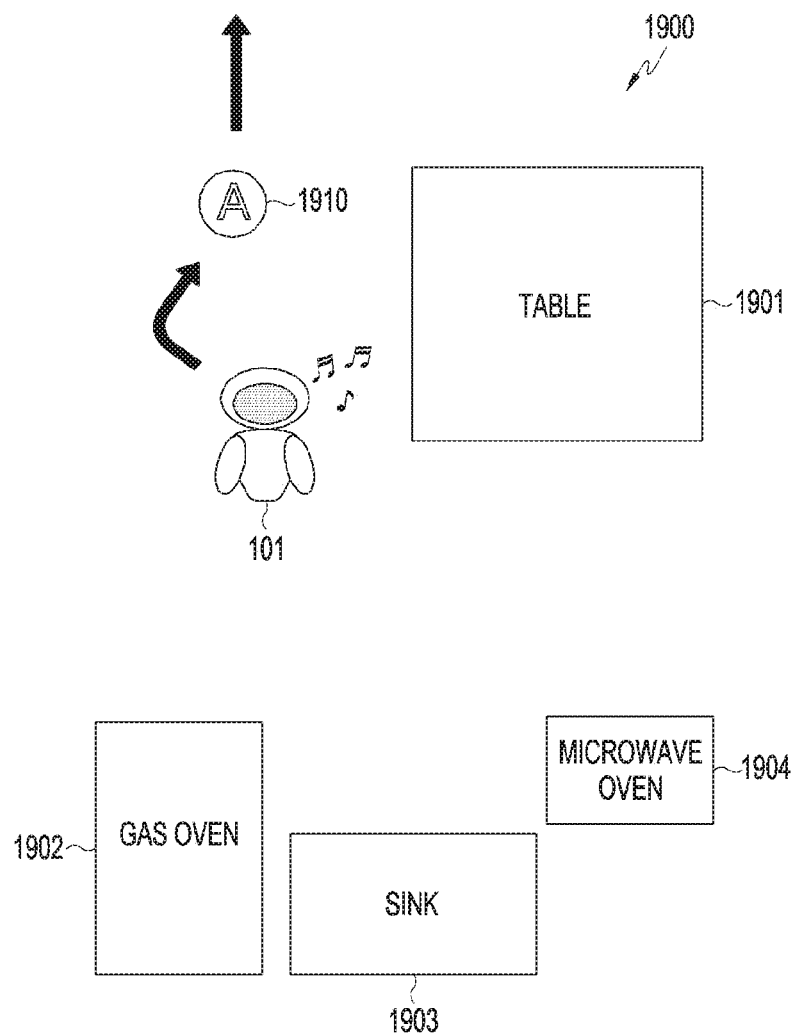

FIGS. 19A, 19B, and 19C are diagrams of the movement of an electronic device, according to an embodiment.

Referring to FIGS. 19A, 19B and 19C, a table 1901, a gas oven 1902, a sink 1903, and a microwave oven 1904 may be positioned in an indoor environment 1900. The electronic device 101 may sense a speech 1911 produced by a user 1910. The electronic device 101 may receive an ambient noise 1905 and speech 1911 together, extract the speech 1911, and identify a spot at which the extracted speech 1911 has been produced. The electronic device 101 may extract the speech 1911, using a spectrogram for data from a microphone. The electronic device 101 may identify a position where the speech 1911 was produced, based on at least a difference in time point at which an array of microphones have received the extracted speech 1911. The electronic device 101 may identify a position where an ambient noise 1905 is generated. The electronic device 101 may acquire the text "Play music" by applying ASR to an electric signal processed from the speech 1911. The electronic device 101 may identify the text as a task execution instruction for "music reproduction command" by applying NLU to the corresponding text. The electronic device 101 may move to a spot at which the speech 1911 is identified to have been produced or may perform rotation toward a spot at which the speech 1911 is identified to have been produced. The electronic device 101 may take photographs and thus may acquire an image covering a user 1910. The electronic device 101 may recognize a user. The electronic device 101 may output an alarm, such as beep, as feedback in response to the sensing or recognition of the speech 1911. The electronic device 101 may give a particular object on a display as feedback for the sensing or recognition of the speech 1911.

The electronic device 101 may analyze at least one image for a user 1910 and may recognize that the user 1910 is doing a task in a kitchen, based on the interpretation of a scene context among analysis results. The electronic device 101 may photograph a scene covering the user 1910 and objects 1902, 1903, and 1904 and may analyze an image to identify positional correlation between the user 1910 and objects 1902, 1903, and 1904. The electronic device 101 may identify as a target spot a position at which a user can hear music which is being reproduced, based on a spot at which at least ambient noise 1905 is being generated. The electronic device 101 may produce and manage map data related with noise levels and may identify a target spot corresponding to the task execution instruction of "music reproduction command", using the map data. The electronic device 101 may identify the generation of ambient noise 1905 having a relatively high decibel from a gas oven 1902 and may move near a microwave oven 1904 spaced apart by a predetermined distance from the corresponding position. The electronic device 101 may identify a movement route, based on map data including at least the positions of the objects 1901, 1902, 1903, and 1904 and may move to a target spot, based on the movement route. The electronic device 101 may move near a microwave oven 1904 and reproduce music 1921. The electronic device 101 may determine the reproduction volume of music 1921 in consideration of the surrounding ambient noise 1905.

The electronic device 101 may measure a noise level, which is a factor related with task execution, in real time during task execution. The ambient noise 1905 generated from the gas oven 1902 is no more produced whereas the microwave oven 1904 may generate ambient noise 1906. The electronic device 101 may shift the task execution position based on at least the position at which the ambient noise 1906 is being produced. The electronic device 101 may move near the gas oven 1902 spaced apart by a predetermined distance or longer from the position at which the ambient noise 1906 is being produced so as to reproduce music 1921.

The electronic device 101 may continue to take a picture of a user during task execution. As shown in FIG. 19C, the electronic device 101 may identify the movement of the user based on the photograph result. A task executable range for "music reproduction command" may be set forth as a threshold distance or less from the user 1910. Accordingly, the electronic device 101 may change the task executable range, depending on the positional change of the user 1910. The electronic device 101 may move, following the user 1910, so as to position within a task executable range. The electronic device 101 may sense the surroundings while the electronic device 101 moves, following the user 1910. The electronic device 101 may move to position within a threshold distance or less from the user 1910. The electronic device 101 may detect a barrier, using the images acquired through a camera and the data acquired through a proximity sensor upon barrier detection, together. The electronic device 101 may keep the distance from the user 1910 to be less than a threshold value, using the data from the distance sensor. When the user 1910 is detected to be shaking himself or herself to a bit, the electronic device 101 may identify through scene analysis that the user 1910 is dancing, and may store the detection as positive feedback. The electronic device 101 may operate based on the existing task execution condition provided with at least positive feedback when receiving a task execution instruction of the same kind. The electronic device 101 may receive an instruction of escaping from the indoor environment 1900 from the user 1910.

The electronic device 101 may move to an indoor environment 1900 (e.g., kitchen) to reproduce music. The user may hardly hear music due to noise and may produce an instruction intended to get out of the indoor environment 1900. The electronic device 101 may manage the response as negative feedback and may reflect it in a task execution condition. When an ambient noise is higher than a threshold value, the electronic device 101 may move to a spot at which an ambient noise is lower than the threshold and then may reproduce music. When a task execution instruction of the same kind (e.g., music reproduction) is received and a noise in the indoor environment 1900 exceeds a threshold, the electronic device 101 may perform a task at a spot (e.g., living room) other than the indoor environment 1900.

Figure 20:
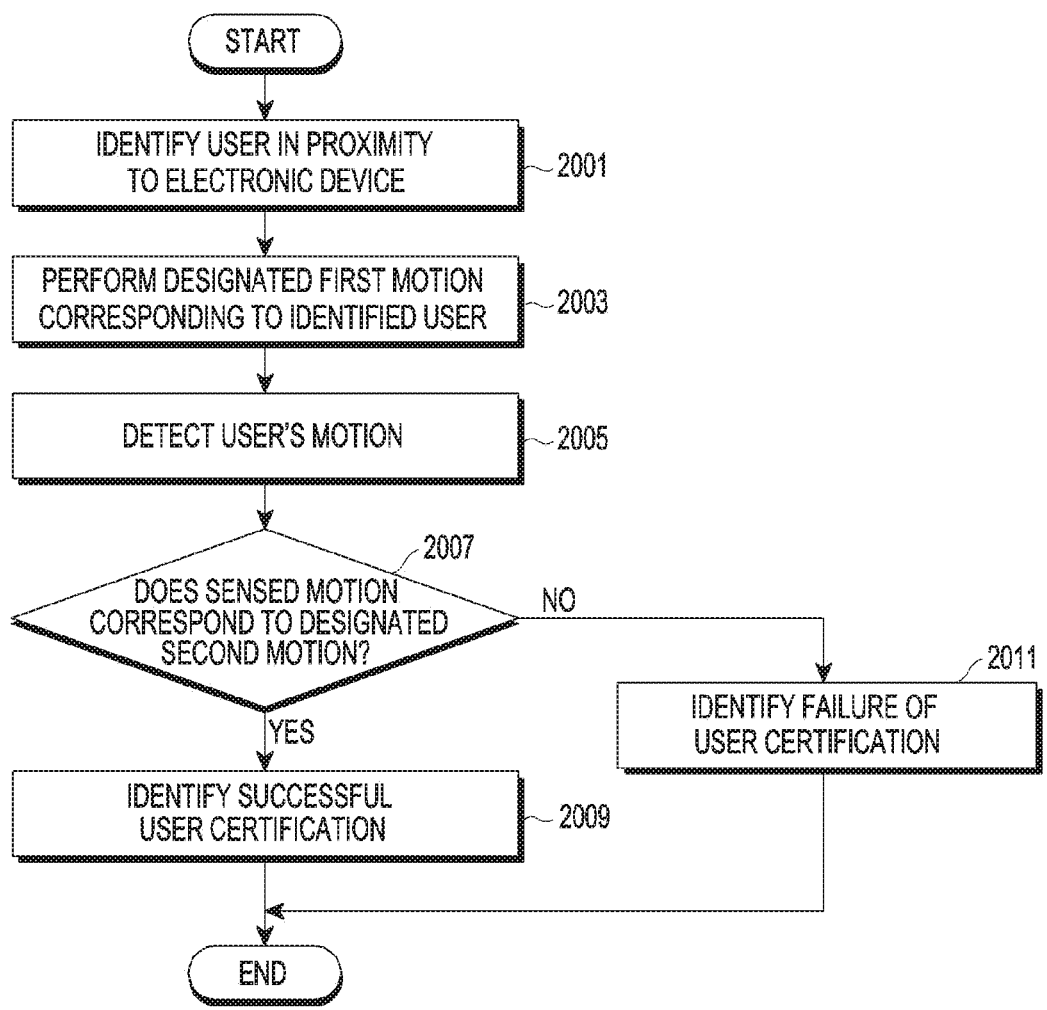
FIG. 20 is a flowchart of operation of an electronic device for executing user certification, according to an embodiment.
Figure 21A:
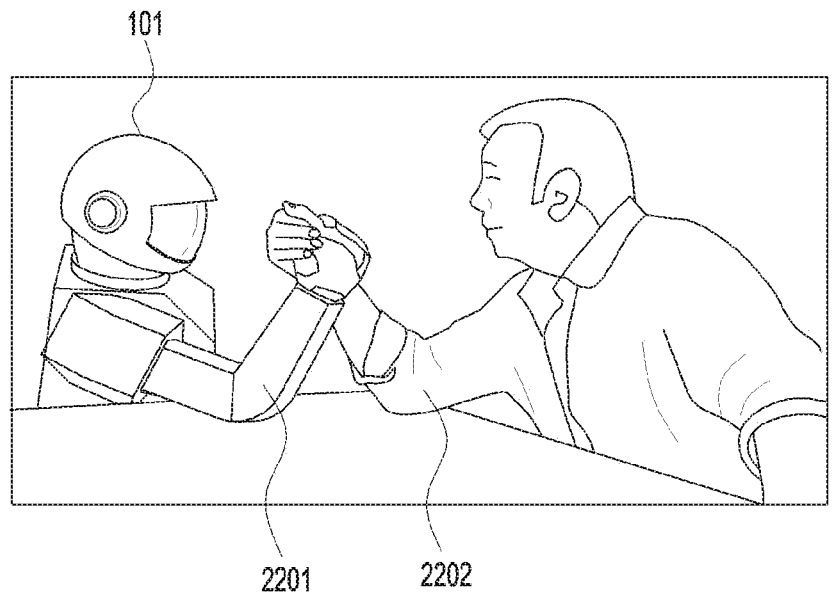
FIGS. 21A and 21B are diagrams of a certification process through motion, according to an embodiment.
Figure 21B:
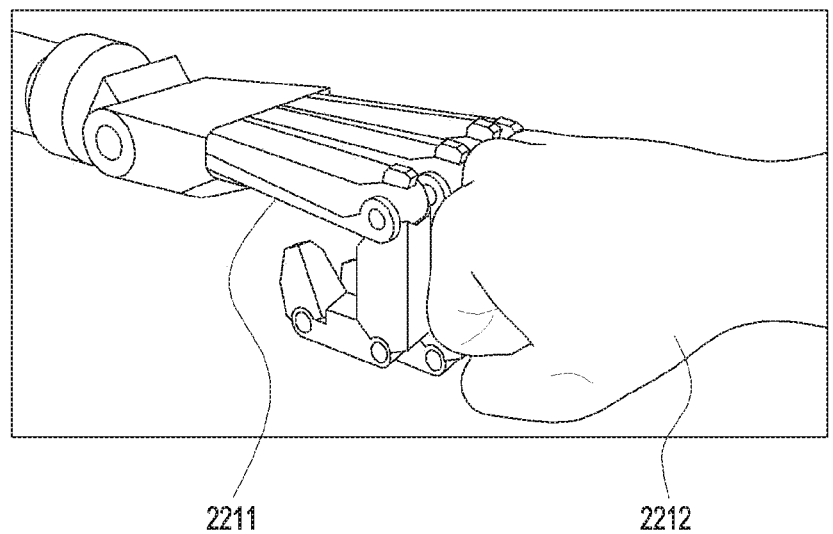

FIG. 20 is a flowchart of operation of an electronic device for executing user certification, according to an embodiment. FIGS. 21A and 21B are diagrams of a certification process through motion, according to an embodiment.

Referring to FIGS. 20, 21A and 21B, the electronic device 101 may identify a user in proximity thereto at step 2001. The electronic device 101 may acquire a task execution instruction requiring certification. The electronic device 101 may be set forth to require certification upon executing a security-required task (e.g., displaying stored photos, electronic payment, etc.). The electronic device 101 may photograph an ambient environment and may detect an object corresponding to the user from the image. The electronic device 101 may apply discrimination algorithm to the object to identify the identification information of the user. The electronic device 101 may identify a user based on various methods, such as sensing bioinformation of a user, analyzing a communication signal from a different electronic device possessed by a user, etc. At step 2003, the electronic device 101 may perform a designated first motion corresponding to an identified user. Information about the first motion may be input beforehand into the electronic device 101 by a user and the electronic device 101 may store information about input motion. The electronic device 101 may also store information about a second motion which a user takes in response to the first motion of the electronic device 101. At step 2005, the electronic device 101 may detect the motion of the user. The electronic device 101 may sense the motion of the user, based on information sensed through at least camera or various sensors. At step 2007, the electronic device 101 may identify whether the sensed motion corresponds to the designated second motion. When the sensed motion is identified to correspond to the designated second motion, the electronic device 101 may identify successful user certification at step 2009. When the sensed motion is identified to correspond to the designated second motion, the electronic device 101 may identify the failure of user certification at step 2011. As shown in FIG. 21A, the electronic device 101 may perform a first motion of folding a first part 2201 corresponding the right arm to raise the hand Based on at least one of the image acquired through at least a camera and at least one of cameras position at the first part 2201, the electronic device 101 may detect the motion that the user 2202 grips at least a part of the first part 2201 with his or her hand. The electronic device 101 may identify whether the motion of the user 2202 corresponds to a predesignated motion and may certify the success or failure of user certification depending on whether to correspond to the designated motion. As shown in FIG. 21B, the electronic device 101 may take such a motion as for a second part 2211 having a hand-like shape clenched into a fist. The electronic device 101 may detect, based on at least one of the image acquired through at least a camera and at least one of cameras position at the first part 2201, the motion that the clenched first of the user 2212 comes to contact with at least a part of the second part 2211. The electronic device 101 may identify whether the motion of the user 2212 corresponds to a predesignated motion and may identify the success or failure of user certification depending on whether to correspond to the designated motion. The second motion may or may not be synchronized with the first motion.

The electronic device 101 may permit access to security-required information. The second motion may be utilized as a certification key to the security-required information. The electronic device 101 may differently set accessible information by users. The electronic device 101 may take advantage of a multi-factor authentication method, which utilizes motion-related factors and other factors (e.g., bioinformation such as iris, fingerprint, etc.)

Various embodiments of the present disclosure may be implemented by software including an instruction stored in a machine-readable storage media readable by a machine (e.g., a computer). The machine may be a device that calls the instruction from the machine-readable storage media and operates depending on the called instruction and may include the electronic device. When the instruction is executed by the processor, the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

The method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. An electronic device, comprising:
   a driving circuit;
   a camera;
   a memory configured to store instructions and information, the information including distances and angles set for obtaining images of a plurality of users including a first user and a second user, wherein a first distance and a first angle between the electronic device and the first user, among the distances and angles included in the information, are set for obtaining a first image of the first user, wherein a second distance and a second angle between the electronic device and the second user, among the distances and angles included in the information, are set for obtaining a second image of the second user; and
   at least one processor configured to execute the stored instructions to at least:
   obtain an execution instruction,
   identify a task corresponding to the execution instruction, the task including an operation obtaining an image through the camera,
   identify a user corresponding to the task among the plurality of users,
   based on identifying that the user corresponding to the task is the first user;
   identify, from the information, the first distance and the first angle corresponding to the first user,
   determine, based on the identified first distance and first angle, a first target spot of the electronic device for obtaining the first image of the first user, a distance and an angle between the electronic device and the first user at the first target spot being the first distance and the first angle, and
control the driving circuit to move the electronic device to the determined first target spot such that the camera obtains the first image of the first user at the determined first target spot, and
based on identifying that the user corresponding to the task is the second user:
identify, from the information, the second distance and the second angle corresponding to the second user,
determine, based on the identified second distance and second angle, a second target spot of the electronic device for obtaining the second image of the second user, a distance and an angle between the electronic device and the second user at the second target spot being the second distance and the second angle, and
control the driving circuit to move the electronic device to the determined second target spot such that the camera obtains the second image of the second user at the determined second target spot.

2. The electronic device of claim 1, wherein the at least one processor is further configured to execute the stored instructions to:
identify a task execution condition including a distance and an angle of the user.

3. The electronic device of claim 2, wherein the task execution condition is identified, at least based on at least one task execution result executed with respect to the user and feedback information to each of the at least one task execution result.

4. The electronic device of claim 3, wherein
the task execution condition comprises information about a utility score provided based on at least one task execution result and the feedback information to each of the at least one task execution result, and
the at least one processor is further configured to execute the stored instructions to select a task execution condition having a highest utility score with reference to the information about the utility score.

5. The electronic device of claim 3, wherein the at least one processor is further configured to execute the stored instructions to:
acquire feedback information to execution of the task, and
update the task execution condition, based on the feedback information.

6. The electronic device of claim 2, wherein the at least one processor is further configured to execute the stored instructions to identify the task execution condition according to a preset initial condition or a random condition when a designated execution condition corresponding to the identified user is absent in relation to the task.

7. The electronic device of claim 2, wherein the at least one processor is further configured to execute the stored instructions to search for a different user having an attribute similar to an attribute of the user and to identify the task execution condition according to a designated execution condition corresponding to the searched different user when a designated execution condition corresponding to the identified user is absent in relation to the task.

8. The electronic device of claim 1, wherein the at least one processor is further configured to execute the stored instructions to:
identify a position of the user and a direction in which the user is facing, and
determine a target spot of the electronic device, based on a distance and an angle of the user, the position of the user, and the direction in which the user is facing.

9. The electronic device of claim 8, wherein the at least one processor is further configured to execute the stored instructions to control the driving circuit such that the electronic device rotates based on the direction in which the user is facing and the angle, after moving to the target spot.

10. The electronic device of claim 1, wherein the at least one processor is further configured to execute the stored instructions to:
identify a task executable range corresponding to the task, and
control the driving circuit such that the electronic device moves to a target spot when the target spot is included within the task executable range or to a spot other than the target spot when the target spot is not included within the task executable range.

11. The electronic device of claim 10, wherein the at least one processor is further configured to execute the stored instructions to identify the task executable range, based on at least one of a kind of the task and a state of the user.

12. The electronic device of claim 11, wherein the state of the user comprises at least one of information related with gaze of the user, information related with interaction of the user, and information related with activity of the user.

13. The electronic device of claim 1, wherein the at least one processor is further configured to execute the stored instructions to:
identify a task for the plurality of users including the user, and,
identify multiple task execution conditions corresponding to the plurality of users,
select a first task execution condition among the multiple task execution conditions, and
determine a target spot of the electronic device, based on the first task execution condition.

14. The electronic device of claim 13, wherein the at least one processor is further configured to execute the stored instructions to:
identify utility scores provided respectively for the multiple task execution conditions according to each of the plurality of users, and
select a first task execution condition such that a sum of utility scores for the plurality of users or a weighed sum of the plurality of users is maximized.

15. The electronic device of claim 13, wherein the at least one processor is further configured to execute the stored instructions to:
identify each of multiple task executable ranges for the plurality of users, and
control the driving circuit to move the electronic device to the target spot when the target spot is included with a common range of the multiple task executable ranges or to move the electronic device to a spot other than the target spot when the target spot is not included within the common range of the multiple task executable ranges.

16. The electronic device of claim 1, wherein the at least one processor is further configured to execute the stored instructions to:
identify a task to be performed for the plurality of users including the user, and,
identify priority between the plurality of users and determine the target spot of the electronic device, based on a task execution condition corresponding to a user having the highest priority.

17. The electronic device of claim 1, wherein the electronic device further comprises a sensor module, and
wherein the at least one processor is further configured to execute the stored instructions to acquire information about an external environment of the electronic device through the sensor module.

18. The electronic device of claim 17, wherein the at least one processor is further configured to execute the stored instructions to determine a target spot of the electronic device, based on at least the information about the external environment.

19. The electronic device of claim 17, wherein the at least one processor is further configured to execute the stored instructions to identify a movement route of the electronic device to a target spot, based on the information about the external environment.

20. The electronic device of claim 1, wherein the at least one processor is further configured to execute the stored instructions to identify a movement route of the electronic device to a target spot, based on at least one of a kind of the task, user information, and a state.

\* \* \* \* \*